United States Patent
Bouazizi et al.

(10) Patent No.: US 11,184,417 B2
(45) Date of Patent: Nov. 23, 2021

(54) SYSTEM AND APPARATUS FOR PROVIDING NETWORK ASSISTANCE FOR TRAFFIC HANDLING IN DOWNLINK STREAMING

(71) Applicant: QUALCOMM Incorporated, San Diego, CA (US)

(72) Inventors: Imed Bouazizi, Frisco, TX (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/064,529

(22) Filed: Oct. 6, 2020

(65) Prior Publication Data

US 2021/0105308 A1 Apr. 8, 2021

Related U.S. Application Data

(60) Provisional application No. 62/912,335, filed on Oct. 8, 2019.

(51) Int. Cl.
*G06F 13/00* (2006.01)
*H04L 29/06* (2006.01)
*H04N 21/845* (2011.01)

(52) U.S. Cl.
CPC .......... *H04L 65/4084* (2013.01); *H04L 65/80* (2013.01); *H04N 21/8456* (2013.01)

(58) Field of Classification Search
CPC . H04L 65/4084; H04L 65/80; H04N 21/8456; H04N 21/845
USPC ............... 709/232, 231, 230, 227, 228, 229, 709/220–222
See application file for complete search history.

(56) References Cited

U.S. PATENT DOCUMENTS

| | | | | |
|---|---|---|---|---|
| 10,659,952 | B2 * | 5/2020 | Wang | H04W 60/00 |
| 10,798,761 | B2 * | 10/2020 | Baek | H04W 76/12 |
| 2018/0359795 | A1 * | 12/2018 | Baek | H04W 76/12 |
| 2019/0261159 | A1 * | 8/2019 | Wang | H04W 48/18 |
| 2020/0359440 | A1 * | 11/2020 | Qiao | H04W 76/12 |

(Continued)

FOREIGN PATENT DOCUMENTS

WO 2018175260 A1 9/2018

OTHER PUBLICATIONS

"3rd Generation Partnership Project; Technical Specification Group Services and System Aspects; 5G Media Streaming (5GMS); General Description and Architecture (Release 16)", 3GPP Standard, Technical Specification, 3GPP TS 26.501, 3rd Generation Partnership Project (3GPP), Mobile Competence Centre, 650, Route Des Lucioles, F-06921, Sophia-Antipolis Cedex, France No. V16.1.0,XP051784948, Retrieved from the Internet: URL: ftp://ftp.3gpp.org/Specs/archive/26_series/26.501/26501-g10.zip 26501-g10.doc [retrieved on Sep. 27, 2019].

(Continued)

*Primary Examiner* — Kenneth R Coulter
(74) *Attorney, Agent, or Firm* — Campbell C. Chiang; Shumaker & Sieffert, P.A.

(57) ABSTRACT

Methods, systems, and devices are provided for streaming service in a fifth generation (5G) system (5GS) network. Various embodiments may provide for selecting appropriate network slices for provisioning media content and streaming service over the network. Desired network slice features may be indicated that correspond to service information.

30 Claims, 14 Drawing Sheets

(56) References Cited

U.S. PATENT DOCUMENTS

2020/0374721 A1* 11/2020 Kumar .............. H04W 72/0446
2021/0120484 A1* 4/2021 Thorat .............. H04W 28/0268

OTHER PUBLICATIONS

"3rd Generation Partnership Project; Technical Specification Group Services and System Aspects; Policy and Charging Control Framework for the 5G System (5GS); Stage 2 (Release 16)", 3GPP Standard, Technical Specification, 3GPP TS 23.503, 3rd Generation Partnership Project (3GPP), Mobile Competence Centre, 650, Route Des Lucioles, F-06921, Sophia-Antipolis Cedex, France SA WG2, No. V16.2.0, Sep. 24, 2019, XP051784673, Retrieved from the Internet: URL: ftp://ftp.3gpp.org/Specs/archive/23_series/23.503/23503-g20.zip 23503-g20.doc.

"3rd Generation Partnership Project; Technical Specification Group Services and System Aspects; System Architecture for the 5G System (5GS); Stage 2 (Release 16)", 3GPP Standard; Technical Specification; 3GPP TS 23.501, 3rd Generation Partnership Project (3GPP), Mobile Competence Centre, 650, Route Des Lucioles, F-06921, Sophia-Antipolis Cedex, France, vol. SA WG2, V16.2.0, Sep. 24, 2019, XP051784669, Retrieved from the Internet: URL: ftp://ftp.3gpp.org/Specs/archive/23_series/23.501/23501-g20.zip 23501-g20.doc.

International Search Report and Written Opinion—PCT/US2020/054530—ISA/EPO—dated Jan. 29, 2021.

Qualcomm Inc: "Network Assistance for Traffic Handling in Downlink Streaming", 3GPP Draft, TSG SA4#100 meeting, S4-191124_Downlink_Streaming_Traffic_Handling, 3rd Generation Partnership Project (3GPP), Mobile Competence Centre, 650, Route Des Lucioles, F-06921, Sophia-Antipolis Cedex, France vol. SA WG4, XP051799421, Retrieved from the Internet: URL:https://ftp.3gpp.org/tsg_sa/WG4_CODEC/TSGS4_106_Busan/Docs/S4-191124.zip S4-191124_Downlink_Streaming_Traffic_Handling.doc [retrieved on Oct. 15, 2019] the Whole Document.

Qualcomm Incorporated: "Updates to Stage 2 on Session Establishment Multiple Network Slices", 3GPP Draft; S4-AHI908, 3GPP TSG-SA4 MBS AHG Meeting, 3rd Generation Partnership Project (3GPP), Mobile Competence Centre, 650, Route Des Lucioles, F-06921 Sophia-Antipolis Cedex, France SA WG4, The Hague, The Netherlands, Nov. 14, 2019, XP051825326, Retrieved from: URL:https://ftp.3gpp.org/tsg_sa/WG4_CODEC/Ad-hoc_MBS/SA4_MBS_SWG_AH_5GMS3/Docs/S4-AHI908.zip S4AHI908_CR_network_slicing_rev2.docx, the Whole Document.

\* cited by examiner

SYSTEM AND APPARATUS FOR PROVIDING NETWORK ASSISTANCE FOR TRAFFIC HANDLING IN DOWNLINK STREAMING

RELATED APPLICATIONS

This application claims the benefit of priority to U.S. Provisional Application No. 62/912,335, entitled "SYSTEM AND APPARATUS FOR PROVIDING NETWORK ASSISTANCE FOR TRAFFIC HANDLING IN DOWNLINK STREAMING" filed Oct. 8, 2019, the entire contents of which are hereby incorporated herein by reference for all purposes.

TECHNICAL FIELD

This application relates to wireless communication systems, and more particularly to 5G Media Streaming (5GMS) Architecture.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The improved latency, reliability, bandwidth, and/or throughput in NR enable various types of network deployments and/or services such as enhanced mobile broadband (eMBB), ultra-reliable, low-latency communication (URLLC), and/or Internet of Things (IoT) services. The different types of services may have different traffic requirements (e.g., latency, bandwidth, reliability, and/or throughput).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one example embodiment, a method for provisioning a service from a network is discussed. The method may include requesting a session information with desired slice features corresponding to a streaming service. The method may include receiving the session information, wherein the session information includes at least two network slices for distribution of the streaming service. The method may include initiating a media session of the streaming service with an application server using the session information. The method may include providing a media playback of the streaming service received in the media session. The method may include selecting a media session route using at least one of: a playback operation point, a traffic descriptor, a domain descriptor, and an application descriptor. The media session route may be further selected with information from a media application function. The at least two network slices may be selected by the media application function and provisioned for the distribution of the streaming service. The method may include initializing the streaming service by fetching an entry point to a media content. The media playback may be triggered by invoking a media player with an entry point to the media content. The session information may further include at least one of: network slice information, a Data Network Name, and a quality of service. The network may support 5G Media Streaming (5GMS).

In another example embodiment, an apparatus for provisioning a service from a network is discussed. The apparatus may include a processor, the processor configured to, request a session information with desired slice features corresponding to a streaming service, receive the session information, wherein the session information includes at least two network slices for distribution of the streaming service, initiate a media session of the streaming service with an application server using the session information, and provide a media playback of the streaming service received in the media session. The processor may be further configured to, select a media session route using at least one of: a playback operation point, a traffic descriptor, a domain descriptor, and an application descriptor. The media session route may be further selected with information from a media application function. The at least two network slices may be selected by the media application function and provisioned for the distribution of the streaming service. The processor may be further configured to, initialize the streaming service by fetching an entry point to a media content. The media playback may be triggered by invoking a media player with an entry point to the media content. The session information may further include at least one of: network slice information, a Data Network Name, and a quality of service. The network may support 5G Media Streaming (5GMS).

In another example embodiment, an apparatus for provisioning a service from a network is discussed. The apparatus may include a means for processing, the means for processing configured to, request a session information with desired slice features corresponding to a streaming service, receive the session information, wherein the session information includes at least two network slices for distribution of the streaming service, initiate a media session of the streaming service with an application server using the session information, and provide a media playback of the streaming service received in the media session. The means for processing may be further configured to, select a media session route using at least one of: a playback operation point, a traffic descriptor, a domain descriptor, and an application descriptor. The media session route may be further selected with information from a media application function. The at least two network slices may be selected by the media application function and provisioned for the distribution of the streaming service. The means for processing may be further configured to, initialize the streaming service by fetching an entry point to a media content. The media playback may be triggered by invoking a media player with an entry point to the media content. The session information may further include at least one of: network slice information, a Data Network Name, and a quality of service. The network may support 5G Media Streaming (5GMS).

In another example embodiment, a non-transitory computer-readable medium storing computer executable code for provisioning a service from a network is discussed. The code when executed by a processor causes the processor to, request a session information with desired slice features corresponding to a streaming service, receive the session information, wherein the session information includes at least two network slices for distribution of the streaming service, initiate a media session of the streaming service with an application server using the session information, and provide a media playback of the streaming service received in the media session. The processor may be further configured to, select a media session route using at least one of: a playback operation point, a traffic descriptor, a domain descriptor, and an application descriptor. The media session route may be further selected with information from a media application function. The at least two network slices may be selected by the media application function and provisioned for the distribution of the streaming service. The processor may be further configured to, initialize the streaming service by fetching an entry point to a media content. The media playback may be triggered by invoking a media player with an entry point to the media content. The session information may further include at least one of: network slice information, a Data Network Name, and a quality of service. The network may support 5G Media Streaming (5GMS).

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
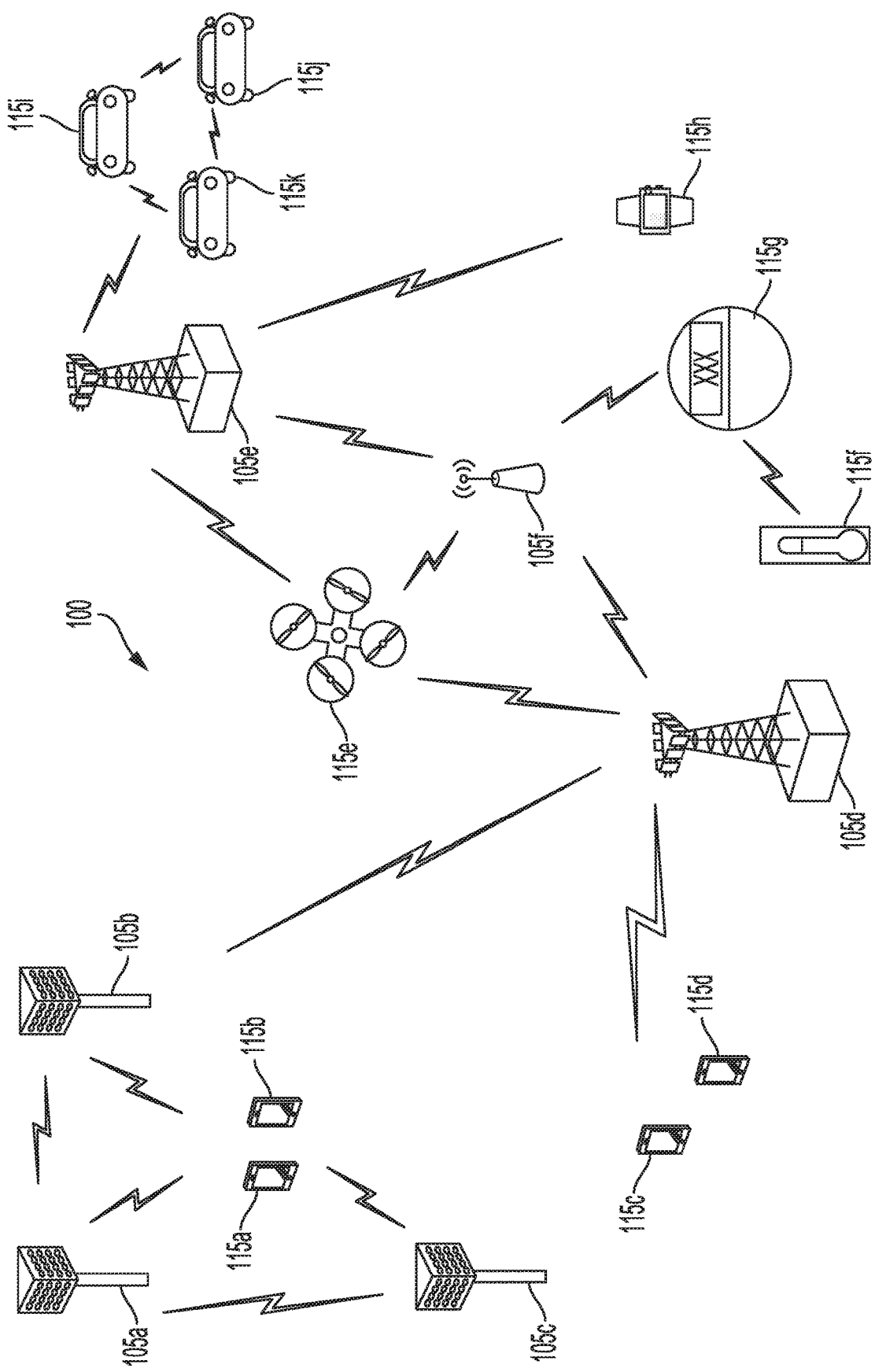
FIG. 1 illustrates a wireless communication network according to some embodiments of the present disclosure.

The 5G Media Streaming (5GMS) architecture may allow external content and service providers to create an Ingest and Distribution configuration (IDC) for content distribution. An IDC is optimized for media distribution over 5GS and leverages the capabilities of the 5GS to offer a custom-made distribution for the media service provider. In some embodiments, the service provider may request assignment of more than one network slice for the distribution. The service provider may indicate desired network slice features that correspond to the service information. Upon successful assignment of the network slices for the service, the network slices may be used by the service provider for content distribution.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

It will be appreciated that various aspects of prior systems may be discussed in, for example, 3GPP TS 23.501, System architecture for the 5G System (5GS), 3GPP TS 23.502, Procedures for the 5G System (5GS), 3GPP TS 23.503, Policy and charging control framework for the 5G System (5GS); Stage 2, 3GPP TS 24.501, Non-Access-Stratum (NAS) protocol for 5G System (5GS); Stage 3, and 3GPP TS 24.526, User Equipment (UE) policies for 5G System (5GS); Stage 3.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR may employ network slicing to configure multiple network slices to support traffic with different traffic requirements. A network slice generally refers to a logical network that comprises a set of network functions and corresponding resources necessary to provide certain network capabilities and network characteristics. A network slice may include functions of an access network (AN) and a core network (CN). A network slice instance (NSI) is an instantiation of a network slice, i.e. a deployed set of network functions delivering the intended network slice services according to a network slice template.

In an example, a network slice comprises control plane and user plane functionality and resources required to fulfill a particular service or set of services and may include: 1) core network control plane and user plane network functions, as well as their resources (in terms of compute, storage and network resources, including transport resources between the network functions); 2) a radio access network; and 3) in the case of a network slice supporting a roaming service, a visitor public land mobile network (VPLMN) part and a home PLMN (HPLMN) part.

In some examples, a UE may be a smartphone that requires multiple services of different traffic requirements. For example, the UE may require an enhanced mobile broadband (eMBB) services with a high throughput most of the time, but may require URLLC services with during certain time periods. Some examples of applications that may require URLLC services may include extended reality (XR) applications, healthcare applications, and/or intelligent transport system applications. With network slicing, operators may typically deploy one or more network slices with a high throughput over a certain frequency carrier (e.g., F1) for serving eMBB services and one or more network slices with a low-latency over another frequency carrier (e.g., F2) for serving URLLC services. The frequency carrier F2 may be configured with a communication configuration that is optimized for URLLC services. For example, the communication configuration for the frequency carrier F2 may be a time-division duplexing (TDD) uplink/downlink (UL/DL) configuration with a numerology (e.g., subcarrier spacing, transmission time intervals, and/or cyclic prefix lengths) that can provide a short latency (e.g., less than about one millisecond). While the frequency carrier F2 optimized for URLLC services may also serve eMBB services and/or voice services, it may be expensive to carry eMBB services and/or voice services over the URLLC frequency carrier F2. As such, operators may configure network slices of different traffic requirements over different frequency carriers to benefit from the network slicing. Accordingly, there is a need to provide mechanisms for a UE to request URLLC services over a URLLC frequency carrier (e.g., F2) as needed while connected to an eMBB frequency carrier (e.g., F1).

The present application describes mechanisms for providing on-demand URLLC services. For example, a network may implement network slicing to serve services of different requirements over different network slices and/or over different cell frequencies. The network may include a core network and a radio access network (RAN). In an embodiment, a first cell frequency of the network (e.g., in the RAN) may support an eMBB slice, but may not support a URLLC slice. Instead, a second cell frequency of the network (e.g., in the RAN) may support a URLLC slice. To enable a UE to establish a protocol data unit (PDU) session over a URLLC slice while the UE is accessing the network via the first cell frequency, the core network may indicate that the URLLC slice is allowed based on the network capable of providing a URLLC slice over another cell frequency (e.g., a second cell frequency). While the UE is on the first cell frequency, the URLLC PDU session is inactive and may not have any allocated user plane resource. Upon arrival of URLLC traffic at the UE, the UE may transmit a service request for the PDU session to activate the PDU session. The network may instruct the UE to perform a handover to second cell frequency, a dual-connectivity with the second cell frequency, or a carried aggregation with the second cell frequency. After the UE is on the second cell frequency, the UE may communicate URLLC traffic in the URLLC PDU session over the URLLC slice in the second cell frequency.

In another embodiment, the network may configure an eMBB slice over a first cell frequency and a second cell frequency, where eMBB services may be served over the eMBB slice in the first cell frequency and URLLC services may be served over the eMBB slice in the second cell frequency. The network may allow the UE to establish a PDU session for URLLC while the UE is accessing the network via the first cell frequency. However, the established URLLC PDU session is inactive and may not have any allocated user plane resource. Upon arrival of URLLC traffic at the UE, the UE may transmit a service request for the PDU session to activate the PDU session. The core network may request a BS operating over first cell frequency to configure resources and/or quality of service (QoS) flow for the URLLC PDU session. The BS may instruct the UE to perform a handover to second cell frequency, a dual-connectivity with the second cell frequency, or a carried aggregation with the second cell frequency. The BS may reject the resource configuration request from the core network and provide the core network with a reason or cause of the rejection that the core network may re-initiate the resource and/or QoS flow setup after the handover or redirection.

Aspects of the present disclosure can provide several benefits. For example, the disclosed embodiments allow a UE to establish a URLLC PDU session while the UE is on a cell frequency that does not support a URLLC slice or a URLLC service as long as the network includes a cell frequency that supports a URLLC slice or a URLLC service. While the disclosed embodiments are described in the context of eMBB services and URLLC services, the disclosed embodiments may be applied to any suitable types of services.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115. A registration area may have one or more tracking areas. A tracking area may have one or more cells. Additionally, a tracking area identity (TAI) is an identifier that is used to track tracking areas. The TAI may be constructed from the PLMN identity to which the tracking area belongs and the tracking area code (TAC) of the tracking area.

In an embodiment, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the component carrier to a UE 115 for UL and DL communications. For example, the BWP pair may include one BWP for UL communications and one BWP for DL communications.

In an embodiment, the network 100 may be a 5G network. The network 100 may implement network slicing to create multiple isolated virtual networks or independent logical network slices to support a variety of application services in the network 100. The network 100 may configure each network slice according to the specific needs of the services being served. In an embodiment, the network 100 may configure a network slice with a high throughput for serving eMBB services and configure another network slice with a low latency and high reliability for serving URLLC services.

The network 100 may configure network slices with different traffic requirements over different frequency carriers. For example, the network 100 may configure different frequency carriers with different communication configuration. The network 100 may configure a frequency carrier F1 with a communication configuration that can provide a high throughput and another frequency carrier F2 with a communication configuration that can provide a low latency. The network 100 may configure one or more network slices in the frequency carrier F1 for serving eMBB services. The network 100 may configure one or more network slices in the frequency carrier F2 for serving URLLC services. A UE 115 may be served by a BS 105 in the eMBB frequency carrier F1 and may receive eMBB services over one or more of the eMBB network slices on F1. When the UE 115 detected arrival of URLLC data, the UE 115 may require URLLC services. Mechanisms for a UE 115 to request URLLC services on demand while being served over an eMBB frequency carrier are described in greater detail herein.

Figure 2:
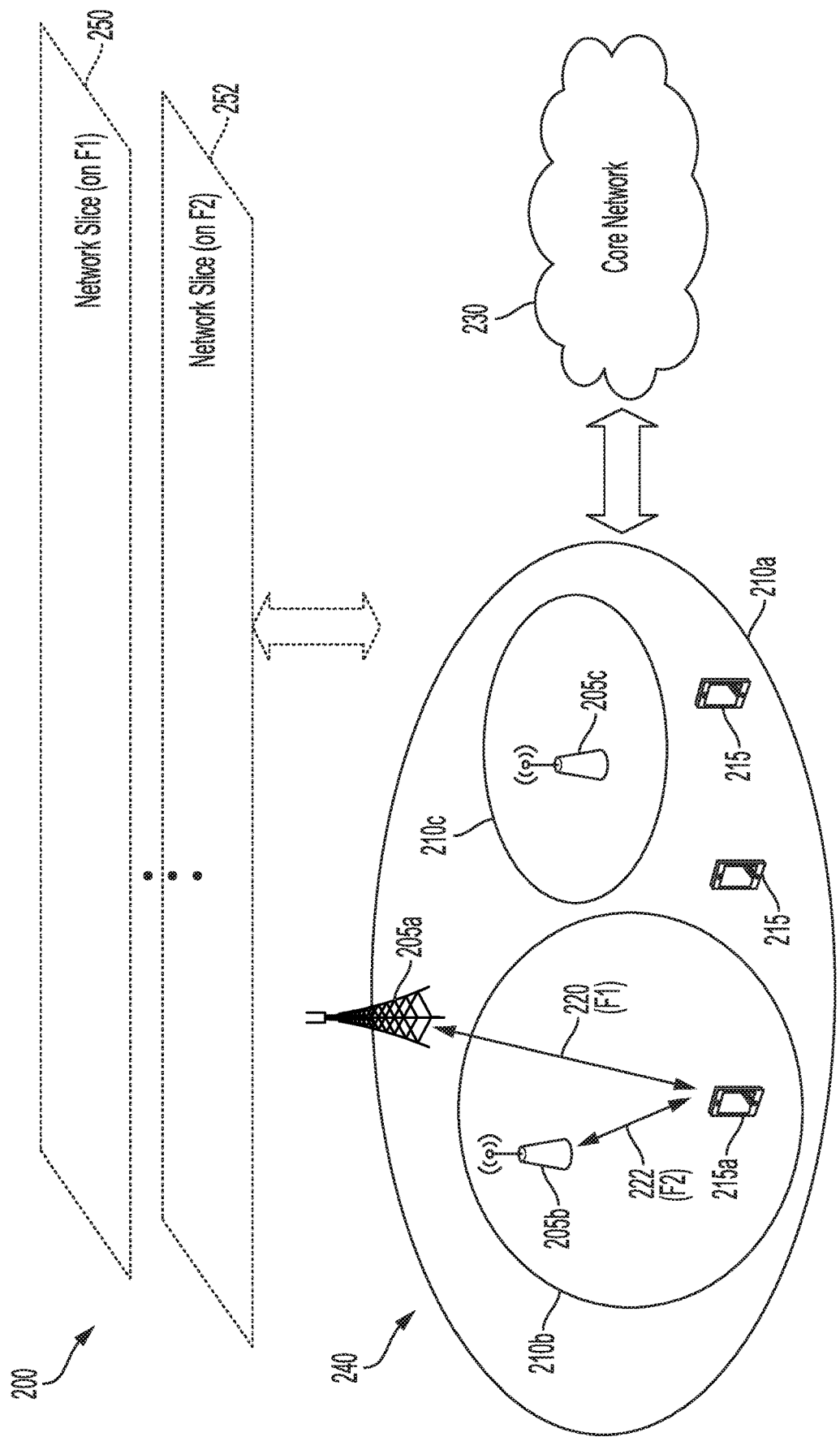
FIG. 2 illustrates a wireless communication network system that implements network slicing according to some embodiments of the present disclosure.

FIG. 2 illustrates a wireless communication network 200 that implements network slicing according to some embodiments of the present disclosure. The network 200 may correspond to a portion of the network 100. The network 200 may be a 5G network. The network 200 includes a radio access network (RAN) 240 in communication with a core network 230 via backhaul links 232. For simplicity of illustration and discussions, FIG. 2 illustrates three BSs 205a, 205b, and 205c and three UEs 215 in the RAN 240. However, the RAN 240 may be scaled to include any suitable number of BSs (e.g., about 2, 4, 5, or more) and/or any suitable number of UEs (e.g., up to millions). The BSs 205 are similar to the BSs 105. The UEs 115 are similar to the UEs 115.

In the network 200, the BS 205a may serve UEs 215 over a frequency carrier 220 (shown as F1) in an area 210a, the BS 205b may serve UEs 215 over another frequency carrier 222 (shown as F2) in an area 210b, and the BS 205c may serve UEs 215 over the frequency carrier 222 in an area 210c. The frequency carrier 220 and the frequency carrier 222 may be at any suitable frequency. In some examples, the frequency carrier 220 and the frequency carrier 222 can be at sub-6 gigahertz (GHz) bands. In some examples, the frequency carrier 220 and the frequency carrier 222 can be at mmWav bands. In some examples, one of the frequency carriers 220 and 222 can be at a sub-6 GHz band and the other frequency carriers 220 and 222 can be at a mmWav band.

In an example, the UEs 215 may be a smart phone requiring eMBB services and may additionally require URLLC services. In an example, the UE 215a may include an extended reality (XR) application and may require an URLLC service for communicating XR application data. In an example, the UE 215a may be a remote diagnostic device with sensors that requires an URLLC service for communicating health monitoring information. In an example, the UE 215a may be associated with an intelligent transportation system that requires an URLLC service for communicating transport information. In some examples, the UE 215a may require an eMBB service and URLLC services at the same time.

In an example, the core network 230 is a 5G core network and may provide network functions such as an authentication server function (AUSF), an AMF, a session management function (SMF), a policy control function (PCF), a user plane function (UPF), an application functions (AFs), a unified data repository (UDR), an unstructured data storage network function (UDSF), a network exposure function (NEF), an NF repository function (NRF), a unified data management function (UDM), and/or a network slice selection function (NSSF). The BSs 205 may coordinate with the core network 230 in serving the UEs 215.

In an example, the network 200 may implement network slicing to provision for the eMBB services and the URLLC services. For example, the network 200 may configure one or more network slices 250 over the frequency carrier F1 220 and one or more network slices 252 over the frequency carrier F2 222. Each of the network slices 250 and 252 may function as a logical network and may implement AN and CN functionalities as described above. In an example, all the network slices 250 may serve one type of services (e.g., eMBB services or URLLC services). In an example, at least one network slice 250 may serve a different type of services than the other network slices 250. Similarly, in an example, all the network slices 252 may serve one type of services (e.g., eMBB services or URLLC services). In an example, at least one network slice 252 may serve a different type of services than the other network slices 252.

In an example, the network slices 250 the frequency carrier F1 220 may serve one or more types of services and the network slices 252 the frequency carrier F2 220 may serve one or more types of services, but at least one type of services is served over by one of the network slices 250 and one of the network slices 252. For example, all network slices 250 may serve MBB services, at least one network slice 252 may serve URLLC services, and at least one network slice 252 may serve eMBB services. Alternatively, at least one network slice 250 may serve MBB services, at least one network slices 250 may serve voice services, at least one network slice 252 may serve URLLC services, and at least one network slice 252 may serve eMBB services.

In an example, the network slices 250 and the network slices 252 may serve different types of services. For example, the network slices 250 over the frequency carrier 220 may serve eMBB services, but may not serve URLLC services, whereas the network slices 252 over the frequency carrier 222 may serve URLLC services, but may not serve eMBB services.

In some examples, the frequency carrier 220 may be at about 2.6 GHz and may be shared with a LTE TDD network, whereas the frequency carrier 222 may be at about 4.9 GHz which may not be shared with a LTE TDD network. Due to the sharing with the LTE TDD network on the 2.6 GHz carrier, communications over the 2.6 GHz carrier may have various restrictions. For example, UL-to-DL and/or DL-to-UL switching time for communication over the 2.6 GHz carrier is required to align to the UL-to-DL and/or DL-to-UL switching time of the LTE TDD network. Thus, some operators may deploy eMBB slices, but not URLLC slices over the 2.6 GHz carrier. Instead, the operators may deploy URLLC slices over the less restrictive 4.9 GHz carrier.

In some instances, while the UE 215a is served by the BS 205a over the frequency carrier 220 for an eMBB service in a network slice 250, the UE 215a may launch an application requiring an URLLC service. Thus, the network 200 is required to direct the UE 215a to the frequency carrier 222 so that the UE 215a may receive the URLLC service in a network slice 252. However, the selection and/or configuration of network slices are typically performed by the core network 230 as descried in greater detail herein. The UE 215a may not have knowledge about which frequency carrier or cell in the network 200 may provide a network slice that can support an URLLC service. A BS 205 may be aware of the active network slice used by a UE 215, but may not be aware of which network slice is available or allowed in which frequency carrier over the network 200.

Figure 3:
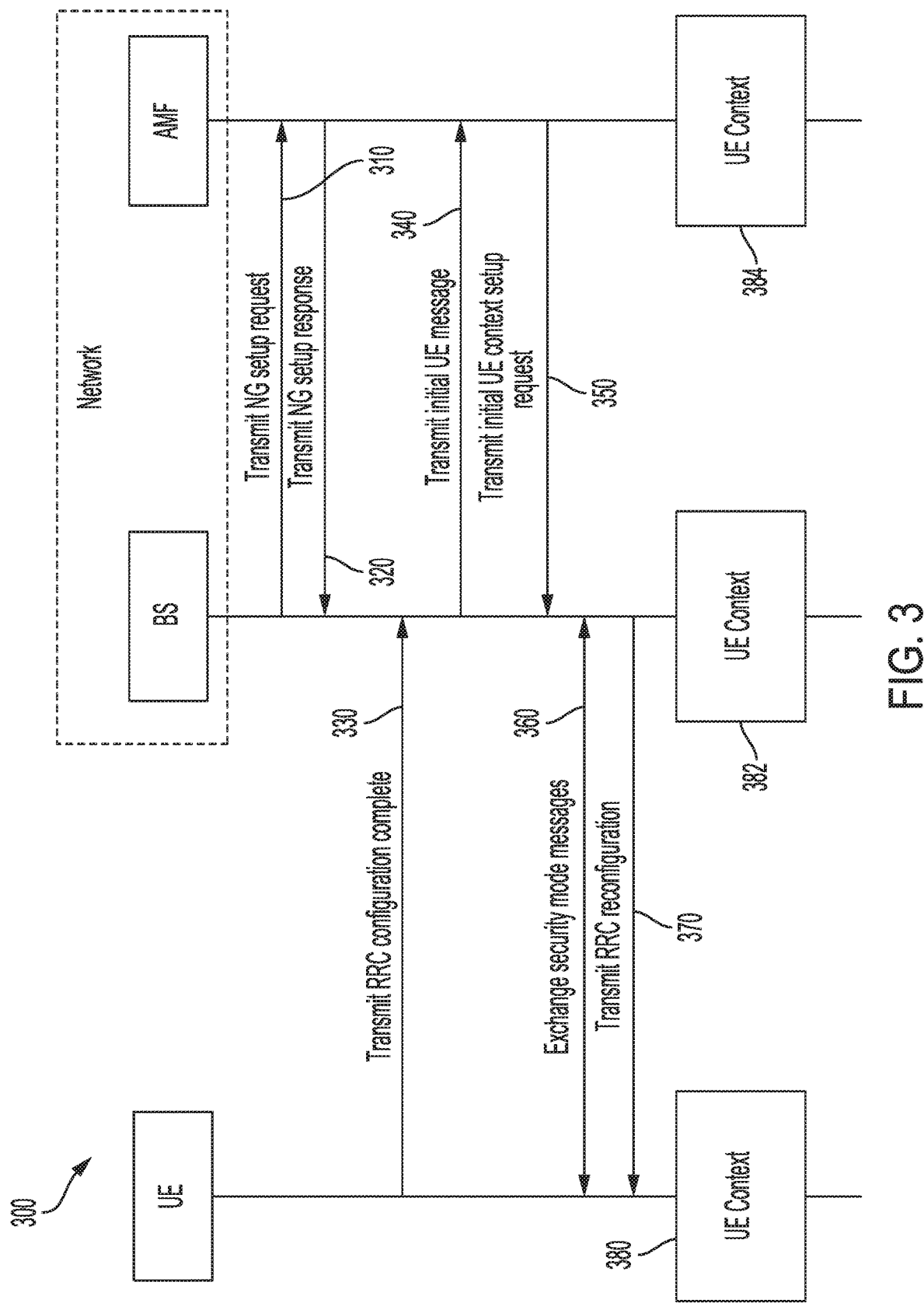
FIG. 3 is a signaling diagram illustrating a network registration method according to some embodiments of the present disclosure.

FIG. 3 is a signaling diagram illustrating a network slicing provisioning method 300 according to some embodiments of the present disclosure. The method 300 may be implemented by a UE similar to the UEs 115 and 215, a BS similar to the BSs 105 and 205, and an AMF (e.g., a component of a core network such as the core network 230). The BS and the AMF may generally be referred to as the network side. Steps of the method 300 can be executed by computing devices (e.g., a processor, processing circuit, and/or other suitable component) of the BS, the UE, and an AMF component. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 310, the BS transmits a next generation (NG) setup request message to the AMF. The NG setup request message indicates one or more network slices (e.g., the network slices 250) supported by the BS. In an example, the NG setup request message may include a single-network slice selection assistance information (S-NSSAI) list per tracking area.

At step 320, in response to the NG setup request message, the AMF transmits a NG setup response message to the BS. Based on the NG setup request message, the AMF may have knowledge of the network slices supported by the BS and/or the tracking area of the BS. The AMF may perform similar NG setup request and response message exchange with other BSs, and thus the AMF may have knowledge of network slices supported by the other BSs and/or other tracking areas.

At step 330, the UE transmits an RRC connection setup completion message to the BS. For example, the UE may have completed a successful random access procedure with the BS. The random access procedure may include the exchange of MSG 1, MSG 2, MSG 3, and MSG 4 described above with respect to FIG. 1. In some instances, the RRC connection setup completion message is exchanged after MSG 4, and may be referred to as a message 5 (MSG 5).

In an example, the RRC connection setup completion message may include a NAS registration request. The NAS registration request may include requested-NSSAI. The requested-NSSAI may indicate one or more network slices (e.g., the network slices 250) requested by the UE, for example, based on applications that may be used by the UE or potentially used by the UE.

At step 340, upon receiving the RRC connection setup completion message indicating NAS registration message, the BS transmits an initial UE message to the AMF. The initial UE message may include the NAS registration request.

At step 350, in response to the initial UE message, the AMF transmits an initial UE context setup request message to the BS. The initial UE context setup request message may include allowed NSSAI. The allowed NSSAI may indicate requested network slices that are allowed in the tracking area. The allowed NSSAI may be a minimal common set of requested-NSSAI, subscribed NSSAI (e.g., based on the UE's subscription), and NSSAI supported by a current tracking area. The initial UE context setup request message may include a NAS registration accept message including the allowed NSSAI. In an example, the UE may include a slice A (e.g., the network slice 250) and a slice B (e.g., the network slice 252) in the requested-NSSAI at the step 330. The AMF may allow slice A, but may reject slice B. In such an example, the AMF may include allowed NSSAI and rejected NSSAI in the initial UE context setup request message. The allowed NSSAI may indicate the slice A and the rejected NSSAI may indicate the slice B.

At step 360, after receiving the initial UE context setup request message from the AMF, the BS and the UE perform a security mode control procedure to exchange various security mode messages.

At step 370, after completing the security mode control procedure, the BS transmits an RRC reconfiguration message to the UE. The RRC reconfiguration message may include a NAS registration accept message indicating allowed NSSAI. At this time, the UE may have a UE context 380 including configured NSSAI (e.g., based on a pre-configuration on the UE), the requested NSSAI, the allowed NSSAI, and/or the rejected NSSAI. The BS may have a UE context 382 including the allowed NSSAI and NSSAI of active PDU sessions of the UE. The AMF may include a UE context 384 including subscribed NSSAI, the requested NSSAI, the allowed NSSAI, and the rejected NSSAI.

Current network slicing technology may have various restrictions. For example, slice support is uniform in a tracking area. Frequency carriers with different slice support are typically configured in different tracking areas. All slices in allowed NSSAI are support by a tracking area. The UE may not be allowed to request a slice that is indicated in the rejected NSSAI except when there is a tracking area change. The UE may only request a PDU session establishment over a slice within the allowed NSSAI. The restrictions on the current network slicing technology and the lack of slice-to-frequency mapping information available at the BS and/or the UE may cause challenges in providing on-demand URLLC services.

Accordingly, the present disclosure provides various techniques to allow a UE (e.g., the UEs 115 and/or 215) to request for a URLLC PDU session while the UE is on a cell frequency that does not support a URLLC slice or a URLLC service.

Figure 4:
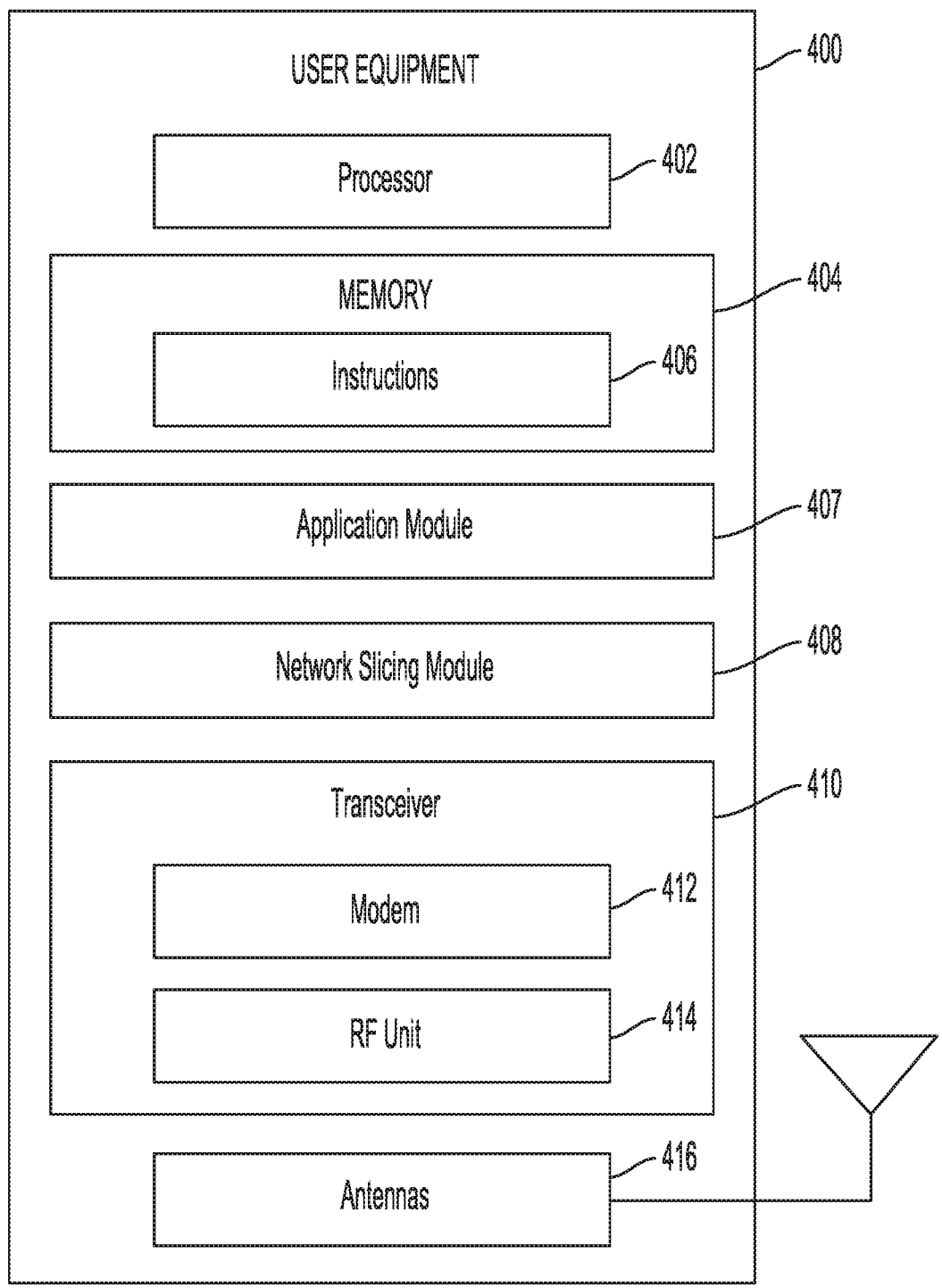
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 or a UE 215 discussed above in FIGS. 1 and 2, respectively. As shown, the UE 400 may include a processor 402, a memory 404, an application module 407, a network slicing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 3, 7, 8, and/or 11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the application module 407 and the network slicing module 408 may be implemented via hardware, software, or combinations thereof. For example, each of the application module 407 and the network slicing module 408 may be implemented as a processor, circuit, and/or instructions 406 stored in the memory 404 and executed by the processor 402. In some examples, the application module 407 and the network slicing module 408 can be integrated within the modem subsystem 412. For example, the application module 407 and the network slicing module 408 can be implemented by a combination of software components (e.g., executed by a DSP or a general processor) and hardware components (e.g., logic gates and circuitry) within the modem subsystem 412. In some examples, a UE may include one or both of the application module 407 and the network slicing module 408. In other examples, a UE may include all of the application module 407 and the network slicing module 408.

Figure 7:
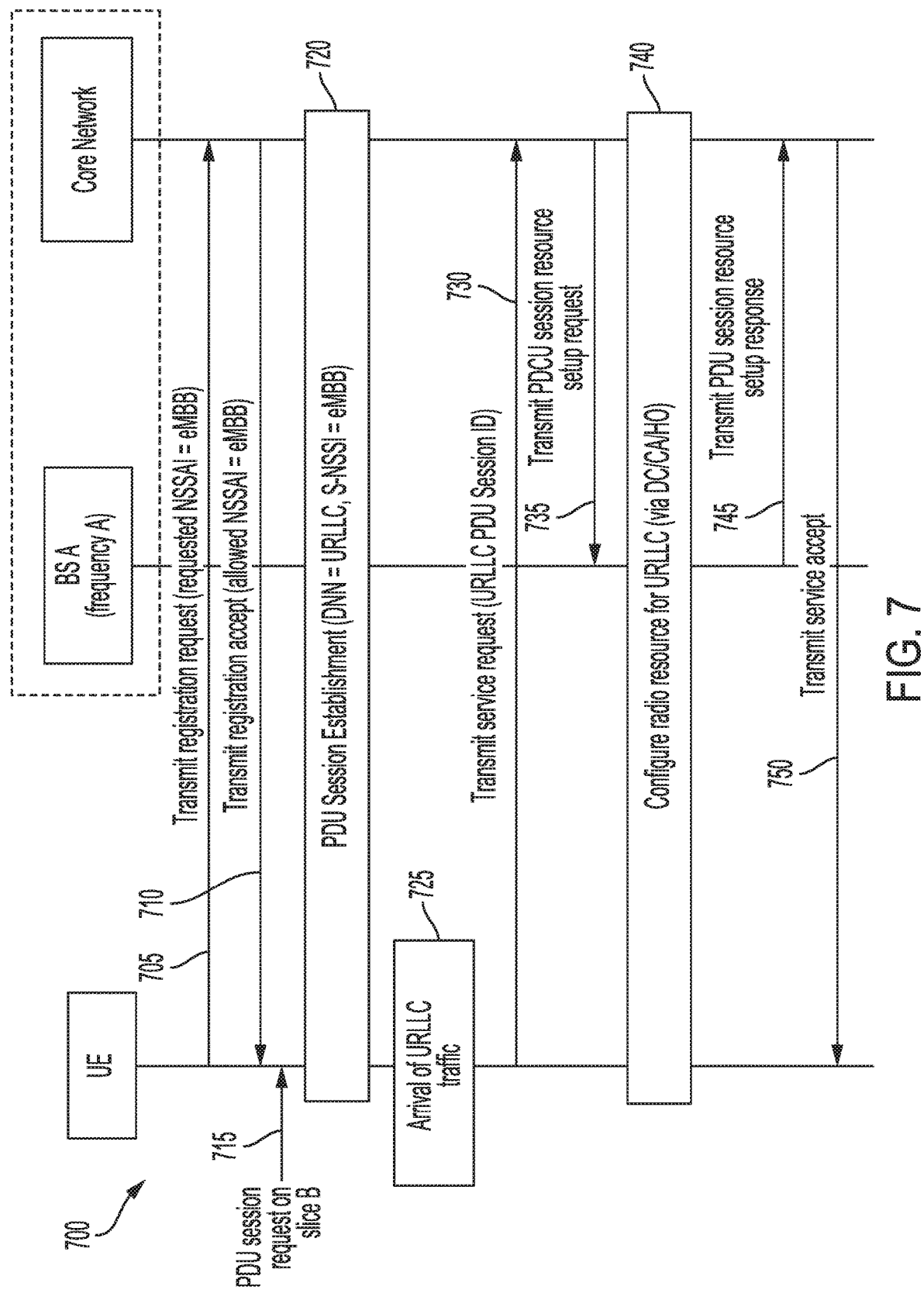
FIG. 7 is a signaling diagram illustrating an on-demand ultra-reliable, low-latency communication (URLLC) method with network slicing according to some embodiments of the present disclosure.
Figure 8:
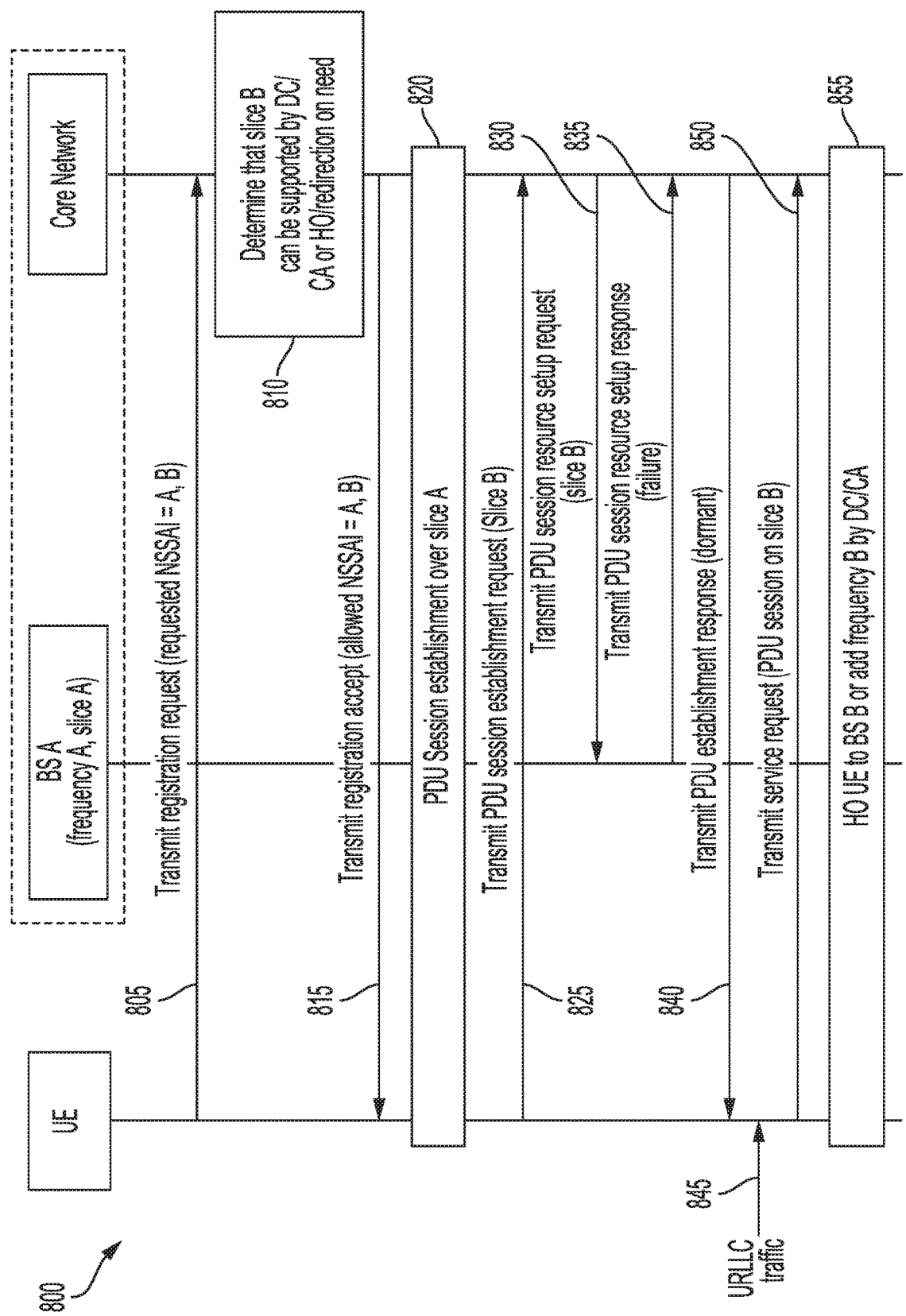
FIG. 8 is a signaling diagram illustrating an on-demand URLLC method according to some embodiments of the present disclosure.

The application module 407 and the network slicing module 408 may be used for various aspects of the present disclosure, for example, aspects of FIGS. FIGS. 3, 7, 8, and/or 11. The application module 407 is configured to implement two or more applications. The applications may have different service requirements (e.g., latency and/or bandwidth). The applications may include at least an eMBB application (e.g., streaming and/or file transfer) and a URLLC application (e.g., XR, remote healthcare related, or intelligent transport related). The application module 407 is configured to transmit a request to setup a PDU session for an eMBB service or a URLLC service to the network slicing module 408.

The network slicing module 408 is configured to perform an association with a BS (e.g., the BSs 105 and/or 205) operating over a first cell frequency (e.g., the frequency carrier 220) of a network (e.g., the networks 100 and/or 200). The association can be based on a cell selection, a camping procedure, a random access procedure, and/or a RRC connection set up. The network slicing module 408 is configured to transmit, via the BS in the first cell frequency to a core network (e.g., the core network 230) of the network, a network registration indicating one or more network slices (e.g., eMBB slices and/or URLLC slices similar to e the network slices 250 and 252) of the network, and receive, from the core network, a network registration response indicating at least a first network slice (e.g., a URLLC slice) of the one or more requested network slices is allowed while the requested network slice is not provided by the first cell frequency. The indication of the un-supported first network slice being allowed is based on a second cell frequency of the network providing the first network slice. The network slicing module 408 is configured to request for a PDU session over the first network slice while the UE 400 is on the first cell frequency, request the network to activate the PDU session upon arrival of data (e.g., URLLC data) requiring a service over the PDU session (e.g., based on need), receive an instruction to perform a handover to a second cell frequency that provides the network slice, perform a dual-connectivity with the second cell frequency, or perform a carrier aggregation with the second cell frequency, perform the handover, the dual-connectivity, and/or the carrier aggregation based on the received instruction, and/or communicate the data over the PDU session on the second cell frequency after performing the handover, the dual-connectivity, or the carrier aggregation.

In an embodiment, the network slicing module 408 is configured to transmit a request for a PDU session to serve a particular traffic (e.g., URLLC traffic) while the UE 400 is on a cell frequency that does not support the particular traffic, request the network to activate the PDU session upon arrival of the particular traffic (e.g., URLLC data) at the UE 400, receive an instruction to perform a handover to a second cell frequency that provides the PDU session, perform a dual-connectivity with the second cell frequency, or perform a carrier aggregation with the second cell frequency, perform a dual-connectivity with the second cell frequency, or perform a carrier aggregation with the second cell frequency based on the received instruction, and/or communicate the particular traffic over the PDU session on the second cell frequency after performing the handover, the dual-connectivity, or the carrier aggregation. Mechanisms for on-demand services (e.g., URLLC services) are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the network slicing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., NAS messages, RRC messages, eMBB data, URLLC data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., NAS messages, RRC messages, URLLC data, eMBB data) to the network slicing module 408 for processing. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
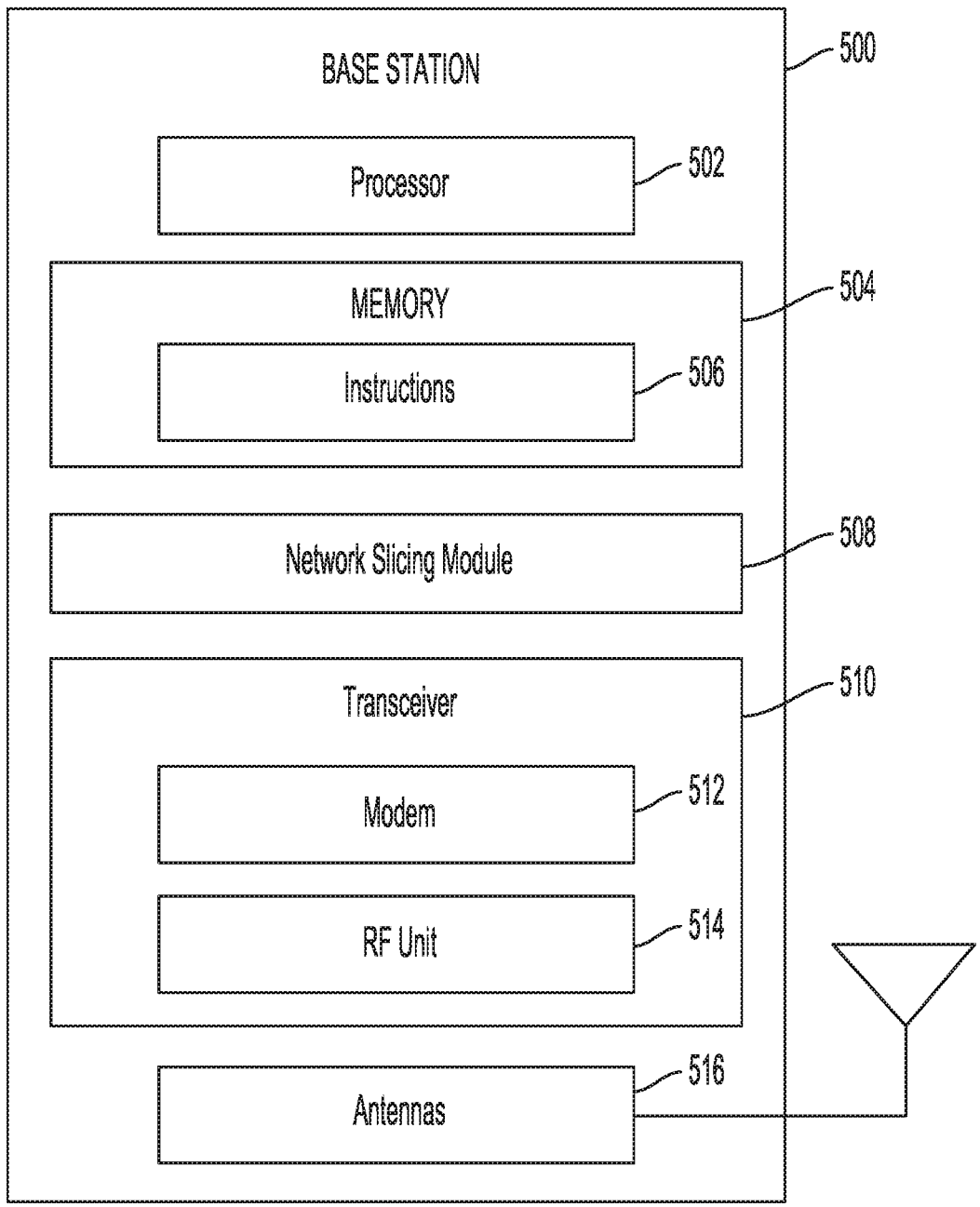
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 or BS 205 as discussed above in FIGS. 1 and 3, respectively. As shown, the BS 500 may include a processor 502, a memory 504, a network slicing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 3 and 7-10. Instructions 506 may also be referred to as code, which may be interpreted broadly to include any type of computer-readable statement(s) as discussed above with respect to FIG. 4.

The network slicing module 508 may be implemented via hardware, software, or combinations thereof. For example, the network slicing module 508 may be implemented as a processor, circuit, and/or instructions 506 stored in the memory 504 and executed by the processor 502. In some examples, the network slicing module 508 can be integrated within the modem subsystem 512. For example, the network slicing module 508 can be implemented by a combination of software components (e.g., executed by a DSP or a general processor) and hardware components (e.g., logic gates and circuitry) within the modem subsystem 512.

The network slicing module 508 may be used for various aspects of the present disclosure, for example, aspects of FIGS. 3 and 7-10. The network slicing module 508 is configured to serve a UE (e.g., the UEs 115, 215, and/or 400) over a first cell frequency (e.g., the frequency carrier 220), receive, from the UE, a network registration request indicating one or more network slices (e.g., eMBB slices and/or URLLC slices similar to the network slices 250 and 252) of the network, forward the network registration request to the BS, receive, from the core network, a network registration response indicating at least a first network slice (e.g., a URLLC slice) of the one or more requested network slices is allowed while the requested network slice is not provided by the first cell frequency, and/or forward, to the UE, the network registration response. The indication of the unsupported first network slice being allowed is based on a second cell frequency of the network providing the first network slice. The network slicing module 508 is configured to receive, from the UE, a request for a PDU session over the first network slice, forward the PDU session request to the core network, receive, from the UE, a request to activate the PDU session upon arrival of data (e.g., URLLC data) requiring a service over the PDU session (e.g., based on need), forward the PDU session activation request to the core network, transmit an instruction to the UE requesting the UE to perform a handover to a second cell frequency that provides the network slice, perform a dual-connectivity with the second cell frequency, or perform a carrier aggregation with the second cell frequency.

In an embodiment, the network slicing module 508 is configured to receive PDU session resource setup request, from the core network (e.g., based on a PDU session activation request from the UE) and transmit a PDU session resource setup response to the core network. The network slicing module 508 may include, in the PDU session resources setup response, an indication that the PDU session resource setup request is accepted. Alternatively, the network slicing module may include, in the PDU session resources setup response, an indication that the PDU session resource setup request is rejected and a cause or reason of the rejection (e.g., due to an on-demand URLLC has been triggered or a service-based mobility has been triggered). Mechanisms for provisioning on-demand URLLC services are described in greater detail herein.

As shown, the transceiver 510 may include the modem subsystem 512 and the RF unit 514. The transceiver 510 can be configured to communicate bi-directionally with other devices, such as the UEs 115, 302, 302, and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., NAS messages, RRC messages, URLLC data, and/or eMBB data) from the modem subsystem 512 (on outbound transmissions) or of transmissions originating from another source such as a UE 115, 302, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, 302, or 400 according to embodiments of the present disclosure. The antennas 516 may further receive data messages transmitted from other devices and provide the received data messages for processing and/or demodulation at the transceiver 510. The transceiver 510 may provide the demodulated and decoded data (e.g., NAS messages, RRC messages, URLLC data, and/or eMBB data) to the network slicing 508 for processing. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
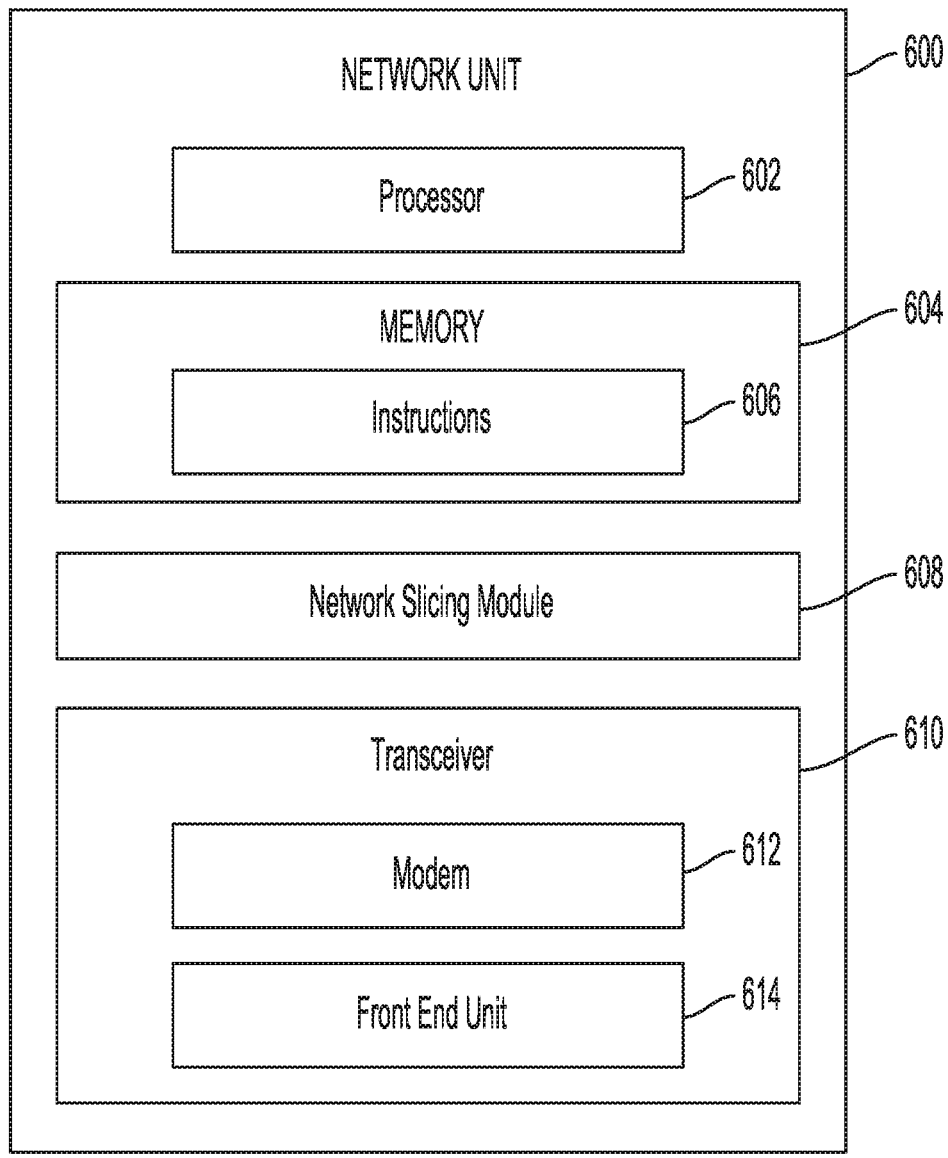
FIG. 6 is a block diagram of an exemplary network unit according to some embodiments of the present disclosure.

FIG. 6 illustrates a block diagram of an exemplary network unit 600 according to embodiments of the present disclosure. The network unit 600 may be a core network component of a core network such as the core network 230 discussed above in FIG. 2. A shown, the network unit 600 may include a processor 602, a memory 604, a network slicing module 608, and a transceiver 610 including a modem subsystem 612 and a frontend unit 614. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 3 and 7-10. Instructions 606 may also be referred to as code, which may be interpreted broadly to include any type of computer-readable statement(s) as discussed above with respect to FIG. 4.

The network slicing module 608 may be implemented via hardware, software, or combinations thereof. For example, the network slicing module 608 may be implemented as a processor, circuit, and/or instructions 606 stored in the memory 604 and executed by the processor 602. The network slicing module 608 may be used for various aspects of the present disclosure, for example, aspects of FIGS. FIGS. 3 and 7-10. For example, the network slicing module 608 is configured to receive, from a UE (e.g., the UEs 115, 215, and/or 400) via a BS (e.g., the BSs 105, 205, and/or 500) in a first cell frequency (e.g., the frequency carrier 220), a network registration request indicating one or more network slices (e.g., eMBB slices and/or URLLC slices similar to the network slices 250 and 252) of the network, determine that a first network slice (e.g., a URLLC slice) of the one or more requested network slices is not supported the first cell frequency that UE is on, determine that the first network slice is supported by a second cell frequency (e.g., the frequency carrier 222) of the network, transmit, to the UE, a network registration response indicating that the first network slice is allowed while the requested network slice is not provided by the first cell frequency based on the second cell frequency providing the first network slice, receive, from the UE, a request for a PDU session over the first network slice, transmit, to the BS, a PDU session resource setup request, receive, from the BS, a PDU session resource setup response, receive, from the UE, a request to activate the PDU session, participate in a handover of the UE to the second cell frequency, a dual-connectivity of the UE with the second cell frequency, or a carrier aggregation of the UE with second cell frequency.

In an embodiment, the network slicing module 608 is configured to receive, from a UE via a BS in a first cell frequency, a request to establish a PDU session for a first service not supported by the first cell frequency, transmit, to the UE a PDU session establishment response accepting the PDU session establishment request, receive, from the UE, a request to activate the PDU session, transmit, to the BS, a PDU session resource setup request (to setup resources and/or QoS flow for serving the PDU session), receive, from the BS, a PDU session resource setup response, and/or participate in a handover of the UE to a second cell frequency of the network that support the PDU session, a dual-connectivity of the UE with the second cell frequency, or a carrier aggregation of the UE with second cell frequency. The PDU session resources setup response may include an indication that the PDU session resource setup request is accepted. Alternatively, the PDU session resources setup response may include an indication that the PDU session resource setup request is rejected and a cause or reason of the rejection (e.g., due to an on-demand URLLC has been triggered or a service-based mobility has been triggered). Upon receiving a PDU session resources setup rejection, the network slicing module 608 is configured to re-initiate the QoS flow setup and/or PDU session resource setup after the handover, dual-connectivity, or carrier aggregation. Mechanisms for provisioning on-demand URLLC services are described in greater detail herein.

As shown, the transceiver 610 may include the modem subsystem 612 and the frontend unit 614. The transceiver 610 can be configured to communicate bi-directionally with other devices, such as the BSs 105, 205, and 600 and/or another core network element. The modem subsystem 612 may be configured to modulate and/or encode data according to a MCS, e.g., a LDPC coding scheme, a turbo coding scheme, a convolutional coding scheme, etc. The frontend unit 614 may include electrical-to-optical (E/O) components and/or optical-to-electrical (O/E) components that convert an electrical signal to an optical signal for transmission to a BS such as the BSs 105, 210, and 220 and/or receive an optical signal from the BS and convert the optical signal into an electrical signal, respectively. The frontend unit 614 may be configured to process (e.g., perform analog to digital conversion or digital to analog conversion, optical to electrical conversion or electrical to optical conversion, etc.) modulated/encoded data from the modem subsystem 612 (on outbound transmissions) or of transmissions originating from another source such as a backend or core network. Although shown as integrated together in transceiver 610, the modem subsystem 612 and the frontend unit 614 may be separate devices that are coupled together at the network unit 600 to enable the network unit 600 to communicate with other devices. The frontend unit 614 may transmit optical signal carrying the modulated and/or processed data over an optical link such as the links 232. The frontend unit 614 may further receive optical signals carrying data messages and provide the received data messages for processing and/or demodulation at the transceiver 610.

FIG. 7 is a signaling diagram illustrating an on-demand URLLC method 700 according to some embodiments of the present disclosure. The method 700 may be implemented by a UE, a BS A, and a core network in a network similar to the networks 100 and/or 200. The UE may be similar to the UEs 115, 215, and/or 400. The BS A may be similar to the BSs 105, 205, and/or 500. The core network may be similar to the core network 230 and may include one or more network components to the network unit 600. In an example, the core network may include an AMF component (e.g., the network unit 600) that implements the method 700. As illustrated, the method 700 includes a number of enumerated steps, but embodiments of the method 700 may include additional steps before, after, and in between the enumerated steps. In some embodiments, one or more of the enumerated steps may be omitted or performed in a different order.

In the method 700, the BS A may operate over a frequency A (e.g., the frequency carrier 220) supporting an eMBB slice. The eMBB slice may also be configured for a frequency B (e.g., the frequency carrier 222) of the network. The eMBB slice may be substantially similar to the network slices 250 and 252. The eMBB slice may support eMBB and/or voice services on the frequency A and may support URLLC services in the frequency B. In some examples, the frequency B may be additionally configured with another slice B that supports URLLC services for IOT devices, but may not be used by smartphone devices (e.g., the UE) for URLLC services. The method 700 may begin after the UE has associated with the BS A over the frequency A. For example, the UE has completed a random access procedure with the BS A.

At step 705, the UE transmits a NAS registration request message to the core network via the BS A. The registration request message may include requested-NSSAI requesting for an eMBB slice.

At step 710, the core network transmits a NAS registration accept or response message to the UE via the BS A. The NAS registration response message may include allowed NSSAI indicating the eMBB slice.

At step 715, the UE receives a request for a URLLC service. The request may be initiated by an application requiring the URLLC service or by a higher layer operating system (OS) of the UE.

At step 720, upon receiving the URLLC service request from the application or higher layer OS, the UE performs a PDU session establishment for URLLC with BS A and the core network. For example, the UE may transmit a PDU session establishment request message to request a PDU session for URLLC. The PDU session establishment request message may include S-NSSAI indicating the allowed NSSAI for the current access on the frequency A. Additionally, the PDU session establishment request message may include a domain network name (DNN) for the requested PDU session. For example, the S-NSSAI may indicate eMBB and the DNN may indicate URLLC.

In response, the core network may transmit a PDU session establishment response message to the UE. The PDU session establishment response message may indicate a successful PDU session establishment. The PDU session establishment response message may indicate a PDU session identifier (ID) for the PDU session. However, when the UE is on the frequency A, the URLLC PDU session is in a dormant mode or inactive mode. There is no user plane (U-plane) resources allocated to the URLLC PDU session.

At step 725, the UE detected arrival of URLLC traffic from the application. The URLLC traffic can include UL data and/or DL data. UL URLLC data can be generated by the UE's application requiring the URLLC service. DL URLLC data can be generated by an application server (e.g., an IoT server) as described in greater detail herein.

At step 730, upon detecting the arrival of UL URLLC data, the UE transmits a NAS service request message to the core network via the BS A. The NAS service request message may request U-plane activation of the URLLC PDU session. The NAS service request message may indicate the PDU session ID assigned to the URLLC PDU session. It should be noted that if the UE has not already established a URLLC PDU session with the network upon the arrival of the URLLC traffic, the UE may establish the URLLC PDU session upon the arrival of the URLLC traffic.

At step 735, upon the receiving the NAS service request for the URLLC PDU session, the core network transmits a PDU session resources setup request message to the BS A. The PDU session resources setup request message may request the BS A to configure data radio bearer (DRB) resources and/or any other U-plane resources required for communicating data over the URLLC PDU session. Additionally or alternatively, the PDU session resources setup request message may request the BS A to modify certain configured radio resources to support the URLLC PDU session.

In some examples, the PDU session resources setup request message may indicate a 5G quality of service identifier (5QI) identifying a certain quality of service (QoS) flow and/or S-NSSAI required for the URLLC PDU session. For example, when the URLLC PDU session was established, the URLLC PDU session may be configured with a default QoS flow, which may be a non-guaranteed bit rate (non-GBR) QoS flow. However, URLLC traffic may require GBR QoS flow. Thus, the PDU session resource setup request message may request the BS A to setup a GBR QoS flow for serving the URLLC PDU session.

As described above, URLLC traffic can include DL data generated by an application server. Thus, a mobile originating (MO) service request (e.g., from the UE) and/or a mobile terminating (MT) service request (e.g., from the application server) may trigger URLLC QoS flow setup.

At step 740, upon receiving the PDU session resources setup request message, the BS A may configure radio resources as instructed by the core network. Depending on the 5QI and/or the S-NSSAI, the BS A may direct the UE to a URLLC capable frequency carrier (e.g., the frequency B). In an example, the BS A may instruct the UE to handover to the frequency B. In an example, the BS A may instruct the UE to perform a dual-connectivity with the frequency B. In an example, the BS A may instruct the UE to perform a carrier aggregation with the frequency B. Handover refers to switching the UE to the frequency B (e.g., served by the BS B over the frequency B). Dual-connectivity refers to configuring the UE with a secondary cell (SCell) over the frequency B served by the BS B. Carrier aggregation refers to configure the UE with a SCell over the frequency B served by the BS A.

At step 745, after completing the radio resource configuration, the handover, the carrier aggregation configuration, or the dual-connectivity configuration, the BS A may transmit a PDU session resource setup response message to the core network.

In an example, the BS A may accept the URLLC QoS flow setup and/or the PDU session request and initiate the handover or redirection (e.g., the dual-connectivity or carrier aggregation configuration). In another example, the BS A may reject the URLLC QoS flow setup and/or the PDU session request. When the BS A includes a rejection response in the PDU session resource setup response message, the BS A may include a reason or cause of the rejection so that the core network (e.g., a SMF component of the core network) may re-initiate the QoS flow setup and/or PDU session setup after the handover or redirection.

The BS A may indicate various causes for rejecting the PDU session resource setup. For example, a first cause-value may indicate that the rejection is due to an on-demand URLLC has been triggered and a second cause-value may indicate a service-based mobility has been triggered. The on-demand URLLC triggered cause may be used to indicate that a handover or redirection of the UE is in progress for setting up a URLLC PDU session. The service-based mobility triggered cause may be used to indicate that a handover or redirection of the UE is in progress for setting up a PDU session for a particular service. In some examples, the cause may indicate that the rejection is due to a NG intra-system handover has been triggered, a NG inter-system handover has been triggered, a Xn handover (e.g., BS to BS handover) has been triggered, a non-supported 5QI value, and/or an Internet multimedia system (IMS) voice evolved packet system (EPS) fallback or radio access technology (RAT) fallback triggered. In some examples, the rejection cause may be indicated in a radio network layer information element (IE) as described in 3GPP document TS 38.413 Release 15, titled "$3^{rd}$ Generation Partnership Project; Technical Specification Group Radio Access Network; NG-RAN; NG Application Protocol (NGAP)," July, 2019, which is incorporated herein by reference. In general, the BS A may indicate any of the causes described in the 3GPP document TS 38.413 and/or the additional on-demand URLLC triggered cause and service-based mobility triggered cause described above.

At step 750, upon receiving the PDU session resource setup response message with an accept response, the core network may transmit a NAS service accept message to the UE via the BS A. If the PDU session resource setup response message with a rejection and a cause of the rejection, the core network may re-initiate the QoS flow setup and/or PDU session setup for URLLC. The core network may determine the re-initiation based on the cause.

After the UE is on the frequency B (e.g., in communication with the network via the frequency B) via the handover, the dual-connectivity, or the carrier aggregation, the UE may communicate the URLLC data in the PDU session over the eMBB slice in the frequency B. As can be observed from the method 700, the UE can establish and activate the URLLC PDU session requiring the URLLC service while the UE is on the frequency A (e.g., in communication with the BS A). The URLLC PDU session activation is completed after the UE is on the frequency B.

In an example, the UE may establish a PDU session for communicating eMBB traffic over the eMBB slice on frequency A. The UE may receive the URLLC traffic (e.g., as shown in the step 725) during the eMBB PDU session. The method 700 allows the UE to establish a PDU session for URLLC (e.g., the step 720) or activate U-plane of the PDU session (e.g., the step 730) while the eMBB PDU session is in progress on frequency A. Accordingly, the method 700 can provide on-demand URLLC services using a single eMBB slice over multiple frequencies.

In an example, the method 700 can be applied in a network deployment with a 2.6 GHz carrier (e.g., the frequency A) and a 4.9 GHz carrier (e.g., the frequency B), where the 2.6 GHz carrier is configured for eMBB slices (e.g., the network slices 250) serving eMBB services and voice services and the 4.9 GHz carrier is configured for eMBB slices serving URLLC services.

While the method 700 is described in the context of the eMBB and URLLC services, where UE requests a URLLC service on-demand while in communication with an eMBB frequency and/or slice, the method 700 can be applied to any suitable types of services to provide on-demand services.

FIG. 8 is a signaling diagram illustrating an on-demand URLLC method 800 according to some embodiments of the present disclosure. The method 800 may be implemented by a UE, a BS A, and a core network in a network similar to the networks 100 and/or 200. The UE may be similar to the UEs 115, 215, and/or 400. The BS A may be similar to the BSs 105, 205, and/or 500. The core network may be similar to the core network 230 and may include one or more network components to the network unit 600. In an example, the core network may include an AMF component (e.g., the network unit 600) that implements the method 700. As illustrated, the method 700 includes a number of enumerated steps, but embodiments of the method 700 may include additional steps before, after, and in between the enumerated steps. In some embodiments, one or more of the enumerated steps may be omitted or performed in a different order.

In the method 800, the BS A may operate over a frequency A (e.g., the frequency carrier 220) supporting a slice A (e.g., an eMBB slice). The network may include a slice B on a frequency B (e.g., the frequency carrier 222) of the network supporting a slice B (e.g., a URLLC slice). The method 700 may begin after the UE has associated with the BS A over the frequency A. The frequency A may be under a tracking area with a tracking area code (TAC) 1. The frequency B may be under another tracking area with a TAC 2 different from the TAC 1. In other words, the 2.6 GHz carrier and the 4.9 GHz carrier may be serving different tracking areas.

The method 800 may begin after the UE has associated with the BS A over the frequency A. For example, the UE has completed a random access procedure with the BS A. At step 805, the UE transmits a NAS registration request message to the core network via the BS A in the frequency A. The registration request message may include requested-NSSAI requesting for a slice A and a slice B.

At step 810, upon receiving the NAS registration request message, the core network determines determine that the slice A is supported in the current frequency A. Additionally, the core network determines that slice B is not supported in the frequency B, but can be supported via a handover, a dual-connectivity, or a carrier aggregation based on needs (e.g., on-demand based upon a PDU session request from the UE). In an example, the core network may have information associated with network slice-to-frequency mapping based on NG setup request and/or NG setup response exchange with BSs (e.g., the BSs 105, 205, and/or 500). The NG setup request and/or NG setup response exchange may be substantially similar to the steps 310 and 320 of the method 300.

At step 815, the core network transmits a NAS registration accept or response message to the UE via the BS A. The NAS registration response message may include allowed NSSAI indicating that the slice A and the slice B are allowed. In a typical NAS registration process, the allowed NSSAI may not include slice B since slice B is not provided by the current frequency A. However, based on the network slice-to-frequency information that the core network obtained, the core network identified that the slice B is provided by the frequency B. Accordingly, the core network includes the slice B in the allowed NSSAI when responding to the NAS registration request At step 820, the UE performs a PDU session establishment for the slice A with BS A and the core network. For example, the UE may transmit, to the core network, a PDU session establishment request message to request a PDU session for a service (e.g., an eMBB service) over the slice A. The PDU session establishment request message may include S-NSSAI indicating the slice A.

At step 825, the UE transmits a PDU session establishment request message to the core network requesting a PDU session over the slice B. The PDU session establishment request message include S-NSSAI indicating the slice B.

At step 830, upon receiving the PDU session establishment request message, the core network transmits a PDU session resource setup request message to the BS A. The PDU session resource setup request message may request the BS A to setup resources for slice B.

At step 835, in response to the PDU session resource setup request message, the BS A transmits a PDU session resource setup response message to the core network. The PDU session resource setup response message may indicate a failure since the BS A does not support the slice B over the frequency A. The PDU session resource setup response message may indicate a cause or reason for the failure and indicate that a handover trigger is required.

At step 840, upon receiving the PDU session resource setup response message, the core network transmits a PDU session establishment response message to the UE via the BS A in the frequency A. The core network may accept the PDU session establishment request, but may the PDU session establishment response message may indicate that the PDU session established for the slice B is in a dormant state or inactive mode. There is no resource (e.g., U-plane resources) allocated to the PDU session. The PDU session establishment response message may indicate a PDU session ID for the established PDU session.

At step 845, the UE received URLLC traffic, for example, from an application of the UE.

At step 850, upon detecting the arrival of the URLLC traffic, the UE transmit a NAS service request message to the core network. The NAS service request message may indicate the PDU session ID for the slice B.

At step 855, BS A may instruct the UE to perform a handover to the frequency B. Alternatively, the BS A may configure the UE for dual-connectivity or carrier aggregation with the frequency B. The UE may perform the handover, dual-connectivity, or carrier aggregation as instructed by the BS A and in coordination with the BS A, the BS B, and/or the core network. For handover, the UE may switch to be served by the BS B over the frequency B. For dual-connectivity, the UE may continue to be served by the BS A over the frequency A and additionally served by the BS B over the frequency B. For carrier aggregation, the UE may continue to be served by the BS A over the frequency A and additionally served by the BS A over the frequency B.

After the UE is on the frequency B (e.g., in communication with the network via the frequency B) via the handover, the dual-connectivity, or the carrier aggregation, the UE may communicate the URLLC data in the PDU session over the slice B in the frequency B.

Similar to the method 700, the transmission of the PDU session resource setup message from the core network to the BS can be triggered by a NAS service request, a URLLC QoS flow setup, and/or a URLLC PDU session setup transmitted by the UE.

As can be observed from the method 800, the UE can establish and activate a PDU session for the slice B while the UE is on the frequency A (e.g., in communication with the BS A). The PDU session activation for the slice B is completed after the UE is on the frequency B. Further, the UE may have an ongoing PDU session on the slice A (e.g., for communicating eMBB data) when UE requests for a PDU session on slice B (e.g., for communicating URLLC data). Accordingly, the method 800 can provide the UE with on-demand URLLC services while the UE is on a frequency that does not provide the URLLC slices by including URLLC slices in allowed NSSAI based on availability of the URLLC slices in another frequency of the network.

In an example, the method 800 can be applied in a network deployment with a 2.6 GHz carrier (e.g., the frequency A) and a 4.9 GHz carrier (e.g., the frequency B), where the 2.6 GHz carrier is configured for eMBB slices (e.g., the network slices 250) serving eMBB services and voice services and the 4.9 GHz carrier is configured for URLLC slices serving URLLC services. In some examples, the 4.9 GHz carrier may also be configured for eMBB slices so that the 4.9 GHz carrier can provide concurrent URLLC services and eMBB services. In some examples, the 2.6 GHz carrier may be in a tracking area with a TAC 1 and the 4.9 GHz carrier may be in a tracing area with a TAC 2 different from the TAC 1. In other words, the 2.6 GHz carrier and the 4.9 GHz carrier may be serving different tracking areas.

While the method 800 is described in the context of the eMBB and URLLC services, where UE requests a URLLC service on-demand while in communication with an eMBB frequency and/or slice, the method 800 can be applied to any suitable types of services to provide on-demand service.

Figure 9:
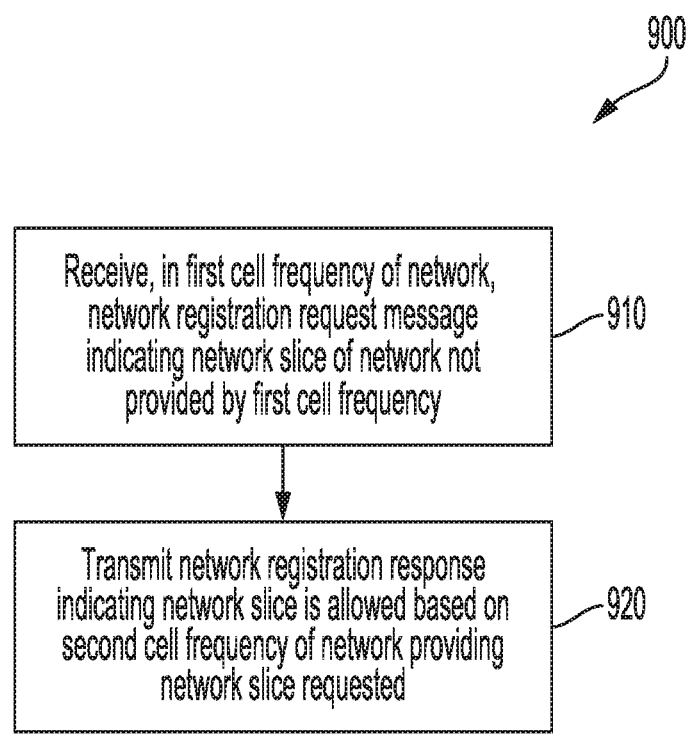
FIG. 9 is a flow diagram of a communication method according to some embodiments of the present disclosure.

FIG. 9 is a flow diagram of a communication method 900 according to some embodiments of the present disclosure. Steps of the method 900 can be executed by a computing device (e.g., a processor, processing circuit, and/or other suitable component) or other suitable means for performing the steps. For example, a network entity, such as the BS 105, 205, and/or 500, may utilize one or more components, such as the processor 502, the memory 504, the network slicing module 508, the transceiver 510, the modem 512, and the one or more antennas 516, to execute the steps of method 900. Alternatively, a network entity, such as a core network 230 and/or the network unit 600, may utilize one or more components, such as the processor 602, the memory 604, the network slicing module 608, the transceiver 610, the modem 612, and the frontend 614, to execute the steps of method 900. The method 900 may employ similar mechanisms as in the methods 300, 700, and/or 800 described above with respect to FIGS. 3, 7, and/or 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving, by a network entity from a UE in a first cell frequency (e.g., the frequency carrier 220) of a network (e.g., the networks 100 and/or 200), a network registration request message indicating a network slice (e.g., the network slices 252) of the network that is not provided by the first cell frequency.

At step 920, the method 900 includes transmitting, by the network entity to the UE in response to the network registration request message, a network registration response message indicating the network slice is allowed based on a second cell frequency (e.g., the cell frequency 222) of the network providing the network slice requested.

In an embodiment, the network entity corresponds to a BS (e.g., the BSs 105, 205, and/or 500). In such an embodiment, the network entity may relay or forward the network registration request message e to a core network entity (e.g., the core network 230 and/or the network unit 600). The network entity may relay network registration response message from the core network entity to the UE.

In an embodiment, the network entity corresponds to a core network (e.g., the core network 230 and/or the network unit 600). In such an embodiment, the network entity may receive the network registration request message from the UE via a BS (e.g., the BSs 105, 205, and/or 500) operating over the first cell frequency. The network entity may transmit the network registration response message to the UE via the BS.

In an embodiment, the network registration request is a NAS network registration request and the transmitting includes transmitting, by the network entity to the UE, the network registration response message including allowed NSSAI indicating the network slice requested, for example, as shown in the method 800.

In an embodiment, the network entity further determines which cell frequency of the network provides the network slice requested in response to the network registration request message, the second cell frequency identified based on the determining.

In an embodiment, the network entity further receives, the UE, a NAS PDU session establishment request message indicating the network slice. The network entity further transmits, to the UE in the first cell frequency, a NAS PDU session establishment response message indicating an inactive PDU session mode (e.g., dormant) in response to the NAS PDU session establishment request message. In an embodiment, the network entity further communicates, with the UE, data in a PDU session over another network slice of the network in the first cell frequency and the PDU session establishment request message may be received during the PDU session over the another network slice. In an embodiment, the network slice is a URLLC slice and the another network slice is a eMBB slice.

In an embodiment, when the network entity corresponds to a BS, the network entity forwards the PDU session establishment request message to a core network entity and receives, from the core network entity, a PDU session resource setup request message indicating the network slice. The network entity further transmits, to the core network entity, a PDU session resource setup response message indicating a failure status based on the network slice not provided by the first cell frequency.

In an embodiment, when the network entity corresponds to a core network entity, the network entity receives the PDU session establishment request message via a BS and transmits, to the BS, a PDU session resource setup request message indicating the network slice. The network entity further receives, from the BS, a PDU session resource setup response message indicating a failure status based on the network slice not provided by the first cell frequency.

In an embodiment, the network entity further receives, from the UE, at least one of a service request message indicating the network slice, a PDU session activation message indicating the network slice, or a flow setup request message indicating the network slice. The network entity further transmits, to the UE, an instruction to perform at least one of a handover to the second cell frequency, a dual-connectivity with the second cell frequency, or a carrier aggregation with the second cell frequency based on the at least one of the service request message, the PDU session activation message, or the flow setup request message.

Figure 10:
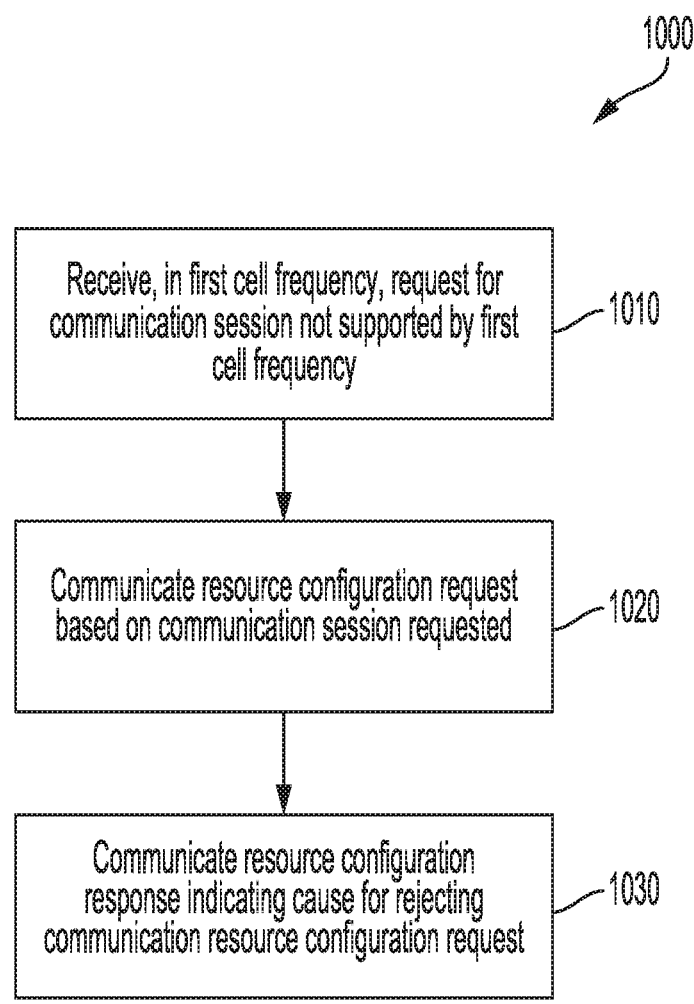
FIG. 10 is a flow diagram of a communication method according to some embodiments of the present disclosure.

FIG. 10 is a flow diagram of a communication method 1000 according to some embodiments of the present disclosure. Steps of the method 1000 can be executed by a computing device (e.g., a processor, processing circuit, and/or other suitable component) or other suitable means for performing the steps. For example, a network entity, such as the BS 105, 205, and/or 500, may utilize one or more components, such as the processor 502, the memory 504, the network slicing module 508, the transceiver 510, the modem 512, and the one or more antennas 516, to execute the steps of method 1000. Alternatively, a network entity, such as a core network 230 and/or the network unit 600, may utilize one or more components, such as the processor 602, the memory 604, the network slicing module 608, the transceiver 610, the modem 612, and the frontend 614, to execute the steps of method 1000. The method 1000 may employ similar mechanisms as in the methods 300, 700, and/or 800 described above with respect to FIGS. 3, 7, and/or 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving, by a first network entity from a UE (e.g., the UEs 115, 215, and/or 400), in a first cell frequency (e.g., the frequency carrier 220), a request for a communication session (e.g., a PDU session for URLLC) not supported by a network slice (e.g., the network slices 250 and 252) on the first cell frequency.

At step 1020, the method 1000 includes communicating, by the first network entity with a second network entity, a resource configuration request (e.g., a NAS PDU session resource setup request) based on the communication session requested.

At step 1030, the method 1000 includes communicating, by the first network entity with the second network entity, a resource configuration response (e.g., a NAS PDU session resource setup response) indicating a cause for rejecting the resource configuration request.

In an embodiment, the first network entity corresponds to a BS (e.g., the BSs 105, 205, and/or 500) and the second network entity corresponds to a core network (e.g., the core network 230 and/or the network unit 600). In such an embodiment, the first network entity receives, from the second network entity, the resource configuration request. The first network entity transmits, to the second network entity, the resource configuration response.

In an embodiment, the first network entity corresponds to a core network (e.g., the core network 230 and/or the network unit 600) and the second network entity corresponds to a BS (e.g., the BSs 105, 205, and/or 500). In such an embodiment, the first network entity transmits, to the second network entity, the resource configuration request. The first network entity receives, from the second network entity, the resource configuration response.

In an embodiment, the communicating the resource configuration response includes communicating, by the first network entity with the second network entity, the resource configuration response indicating that the resource configuration request is rejected based on an on-demand URLLC.

In an embodiment, the communicating the resource configuration response includes communicating, by the first network entity with the second network entity, the resource configuration response indicating that the resource configuration request is rejected based on a service-based mobility.

In an embodiment, the first network entity further participates in at least one of a handover of the UE to a second cell frequency, a dual-connectivity of the UE with the second cell frequency, or a carrier-aggregation of the UE with the second cell frequency based on the communication session requested.

Figure 11:
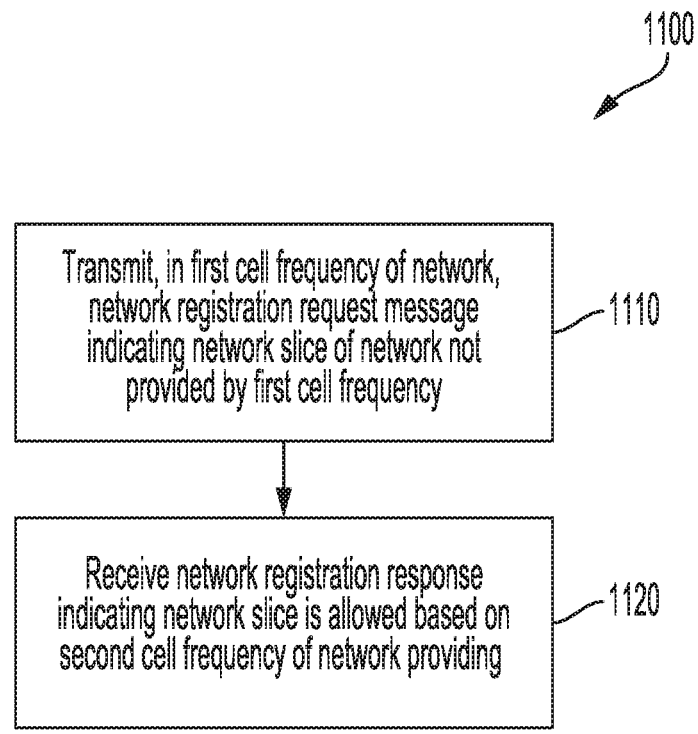
FIG. 11 is a flow diagram of a communication method according to some embodiments of the present disclosure.

FIG. 11 is a flow diagram of a communication method 1100 according to some embodiments of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, UE 215, and/or UE 400, may utilize one or more components, such as the processor 402, the memory 404, the network slicing module 408, the transceiver 410, the modem 412, and the one or more antennas 416, to execute the steps of method 1100. The method 1100 may employ similar mechanisms as in the methods 300, 700, and/or 800 described above with respect to FIGS. 3, 7, and/or 8, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes transmitting, by a UE in a first cell frequency (e.g., the frequency carrier 220) of a network (e.g., the networks 100 and/or 200), a network registration request message indicating a network slice (e.g., the network slices 252) of the network that is not provided by the first cell frequency.

At step 1120, the method 1100 includes receiving, by the UE in response to the network registration request message, a network registration response message indicating the network slice is allowed based on a second cell frequency (e.g., the cell frequency 222) of the network providing the network slice requested.

In an embodiment, the receiving includes receiving, by the UE, the network registration response message including allowed network slice selection assistance information (NSSAI) indicating the network slice requested, for example, as shown in the method 800.

In an embodiment, the UE further transmits, in the first cell frequency, a NAS PDU session establishment request message indicating the network slice. The UE further receives, in the first cell frequency, a NAS PDU session establishment response message indicating an inactive PDU session mode (e.g., dormant mode) in response to the PDU session establishment request message.

In an embodiment, the UE further receives application data (e.g., URLLC data). The UE transmits, in the first cell frequency in response to the application data received, at least one of a NAS service request message indicating the network slice, a NAS PDU session activation message indicating the network slice, or a QoS flow setup request message indicating the network slice. The UE further receives, in the first cell frequency, an instruction to perform at least one of a handover to the second cell frequency, a dual-connectivity with the second cell frequency, or to perform a carrier aggregation with the second cell frequency.

Figure 12:
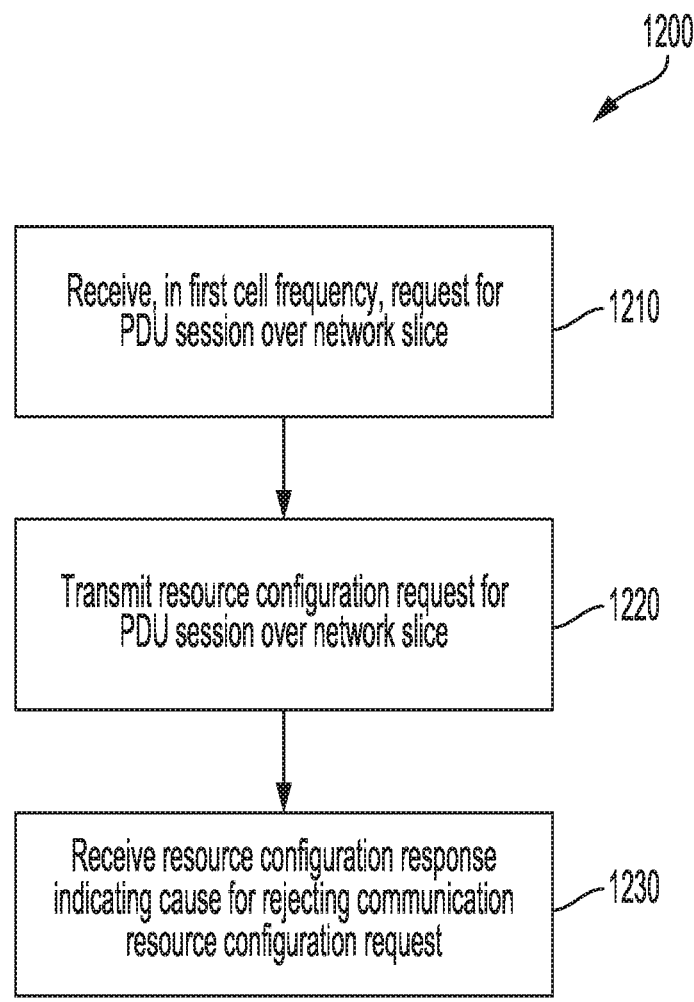
FIG. 12 is a flow diagram of a communication method according to some embodiments of the present disclosure.

FIG. 12 is a flow diagram of a communication method 1200 according to some embodiments of the present disclosure. Steps of the method 1200 can be executed by a computing device (e.g., a processor, processing circuit, and/or other suitable component) or other suitable means for performing the steps. For example, a network entity, such as a core network 230 and/or the network unit 600, may utilize one or more components, such as the processor 602, the memory 604, the network slicing module 608, the transceiver 610, the modem 612, and the frontend 614, to execute the steps of method 1200. The method 1200 may employ similar mechanisms as in the methods 300, 700, and/or 800 described above with respect to FIGS. 3, 7, and/or 8, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, by the core network entity from a UE (e.g., the UEs 115, 215, and/or 400), a request for a PDU session over a network slice (e.g., the network slices 250 and 252).

At step 1220, the method 1200 includes transmitting, by the core network entity to a BS (e.g., the BSs 105, 205, and/or 500), a resource configuration request for PDU session over the network slice.

At step 1230, the method 1200 includes receiving, by the core network entity from the BS, a resource configuration response indicating a cause for rejecting the resource configuration request.

Figure 13:
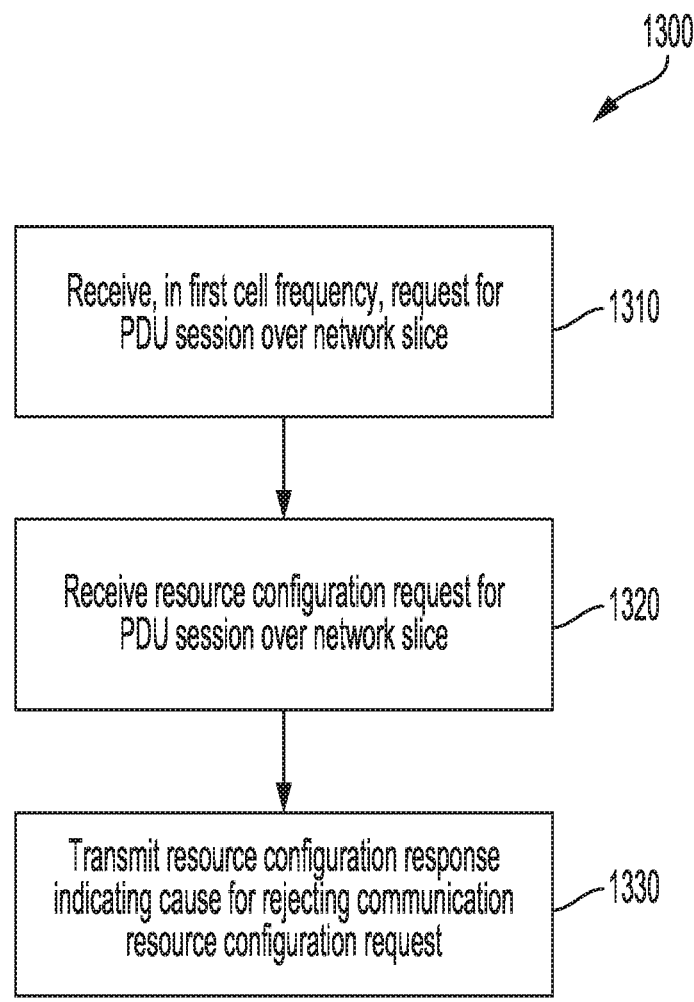
FIG. 13 is a flow diagram of a communication method according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) or other suitable means for performing the steps. For example, a network entity, such as the BS 105, 205, and/or 500, may utilize one or more components, such as the processor 502, the memory 504, the network slicing module 508, the transceiver 510, the modem 512, and the one or more antennas 516, to execute the steps of method 1300. The method 1300 may employ similar mechanisms as in the methods 300, 700, and/or 800 described above with respect to FIGS. 3, 7, and/or 8, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes receiving, by the BS from a UE (e.g., the UEs 115, 215, and/or 400), a request for a PDU session over a network slice (e.g., the network slices 250 and 252).

At step 1330, the method 1300 includes receiving, by the BS from a core network entity (e.g., the core network 230 and/or the network unit 600), a resource configuration request for PDU session over the network slice.

At step 1330, the method 1300 includes receiving, by the BS from the core network entity, a resource configuration response indicating a cause for rejecting the resource configuration request.

An improved system and apparatus for Network Assistance for Traffic Handling in Downlink Streaming will now be discussed. The 5G Media Streaming (5GMS) Architecture allows external content and service providers to create an Ingest and Distribution configuration for their content distribution needs. An Ingest and Distribution Configuration (IDC) is optimized for media distribution over 5GS. It leverages the capabilities of the 5GS to offer a custom-made distribution that meets the needs and resources of the media service provider.

Upon a successful setup of an Ingest and Distribution configuration, the MNO creates or uses an existing corresponding network slice that will be used to serve the content of that IDC. A process for selecting the appropriate network slice will now be discussed.

Network Slice Assignment and Selection

Upon setting up an IDC, the content/service provider is offered the option to associate a network slice with a custom QoS profile. The QoS profile may be of type GBR, delay-critical GBR, or Non-GBR. For GBR flows, the QoS profile provides the GFBR and MFBR and the window over which the bitrate is calculated. These QoS parameters may be customized by the Service provider to best suit the needs of the offered service. Alternatively, the service provider may choose to distribute its content using the standardized eMBB slice with a non-GBR flow.

The IDC is then associated with a Network Slice Selection Assistance Information (NSSAI) that identifies the corresponding network slice. UEs that are allowed by the IDC will receive the NSSAI as part of the Network Slice Selection Policy (NSSP) in the User Route Selection Policy (URSP), which is sent by the PCF to the UE.

Upon setting up a PDP session, the UE will check the URSP rules to retrieve the route selection descriptor that matches the selection rules. The route selection rules may be depicted by the following table:

TABLE 1

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Rule Precedence | Determines the order the URSP rule is enforced in the UE. | Mandatory (NOTE 1) | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

For a service provider, steering related traffic can be simply performed by setting a corresponding domain descriptor, in which it cites its distribution FQDN as a matching parameter. Alternatively the service provider may define an Application descriptor (consisting of an OSId and an OSAppId) or the IP descriptor as the filtering criteria.

The matching Route Selection descriptor contains, among other information, the network slice selection with the S-NSSAI as shown in the following table.

Once the UE determines the DNN and S-NSSAI that it will use for a certain connection/application, it can start the PDU session establishment procedure and provide the requested S-NSSAI(s). If the UE is allowed to use the requested NSSAI, the PDU session will receive the QoS treatment of that network slice.

Network Slice as a Service

The concept of Network Slice as a Service (NSaaS) is defined in 3GPP TS 28.530, Management and orchestration;

TABLE 2

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

Concepts, use cases and requirements. NSaaS can be offered by an MNO to 3$^{rd}$ party providers in the form of a service. This service allows the providers to use the network slice instance as the end user and to manage the network slice instance via a management interface exposed by the MNO.

In turn, these providers offer their own services, e.g. OTT service, on top of the network slice instance obtained from the MNO.

The NSaaS offered by the MNO can be characterized by certain properties (capabilities to satisfy service level requirements), for example: radio access technology, bandwidth, end-to-end latency, reliability, guaranteed/non-guaranteed QoS, security level, etc.

The interface that is used for the creation and management of network slices is defined in 3GPP TS 28.531, Management and orchestration; Provisioning and the information elements are defined in 3GPP TS 28.541, Management and orchestration; 5G Network Resource Model (NRM); Stage 2 and stage 3.

Fine Granular Differentiation

S-NSSAI

An IDC may be offered to a wide range of devices with different rendering and processing capabilities. For instance, a UE may offer multiple options to the user to consume the service, e.g. it may offer to render the service on the UE directly or may offer to render it on an external, more capable, screen. The user may switch between the two displays during the same session. An example of this scenario is as follows: a user is watching a video using a popular OTT service on her smartphone on her way home. Once she arrives at home, the user decides to cast the same video to her 8K TV in the living room.

To address such a scenario, a single IDC may be associated with a set of S-NSSAIs, that share the same filtering rules but differ in the QoS profiles that will be applied to the flows. The S-NSSAI has the following syntax:

TABLE 3

| 8 | 7 | 6 | 5 | 4 | 3 | 2 | 1 | |
|---|---|---|---|---|---|---|---|---|
| | | | S-NSSAI IEI | | | | | octet 1 |
| | | Length of S-NSSAI contents | | | | | | octet 2 |
| | | | SST | | | | | octet 3 |
| | | | SD | | | | | octet 4* |
| | | | | | | | | octet 6* |
| | | Mapped HPLMN SST | | | | | | octet 7* |
| | | Mapped HPLMN SD | | | | | | octet 8* |
| | | | | | | | | octet 10* |

The group of the S-NSSAIs for a particular IDC will share the same Slice/Service Type (SST), but they will differ in the Slice Differentiator (SD).

Mapping of Slice Differentiator

The service provider may define a set of operation points for the service that it offers as part of the service. Each operation point is mapped into a QoS profile that matches the required resources for receiving the service at that operation point.

As an example, an OTT service may offer an HD and a 4K representation of the video content, described as two different DASH Representations of the same AdaptationSet. Each of these representations will result in a different set of QoS requirements. When configuring the IDC, the service provider will request the Media AF to allocate a group of two network slices for this service. The same SST value will be assigned to both. The SD value of the S-NSSAI is mapped to an identifier of the IDC and an identifier of the operation point as follows:

TABLE 4

| IDC Identifier 0 | octet 4* |
|---|---|
| IDC Identifier 1 | |
| Operation Point Id | octet 6* |

The IDC identifier will usually be assigned by the Media AF and the PCF after successful creation of the IDC. The Operation Point Id is agreed between the Media AF and the service provider. However, the service provider is free to map it to a service operation point of its choice. That mapping is then signaled to the UE as part of the service description.

DASH Mapping

If the service is distributed using DASH, the service provider may use the ServiceDescription element to convey the operating points and their corresponding identifiers in the MPD. For this purpose, a dedicated scope is identified as follows:

@schemeIdUri: "urn:org:3gpp:5g:dash:nssai-sd:op"

@value: indicates the operating point identifier as a string.

The value shall be a number between 0-255

The ServiceDescription shall include at least one OperatingBandwidth element and may contain a Latency element.

Call Flow for Downlink Streaming

The service provider requests the assignment of one or more network slices for the distribution of the service. The service provider indicates the required QoS parameters that can be derived from the service information, such as a DASH MPD. These QoS parameters include, among other things, the GFBR, MFBR and the latency for a GBR flow. Upon successful assignment of the network slices for the service, the Media AF will respond with the list of allowed S-NSSAIs to the service provider. The service provider will signal its offered operation points and their mappings to the S-NSSAI in the service description, e.g. in the DASH MPD as discussed earlier.

Figure 14:
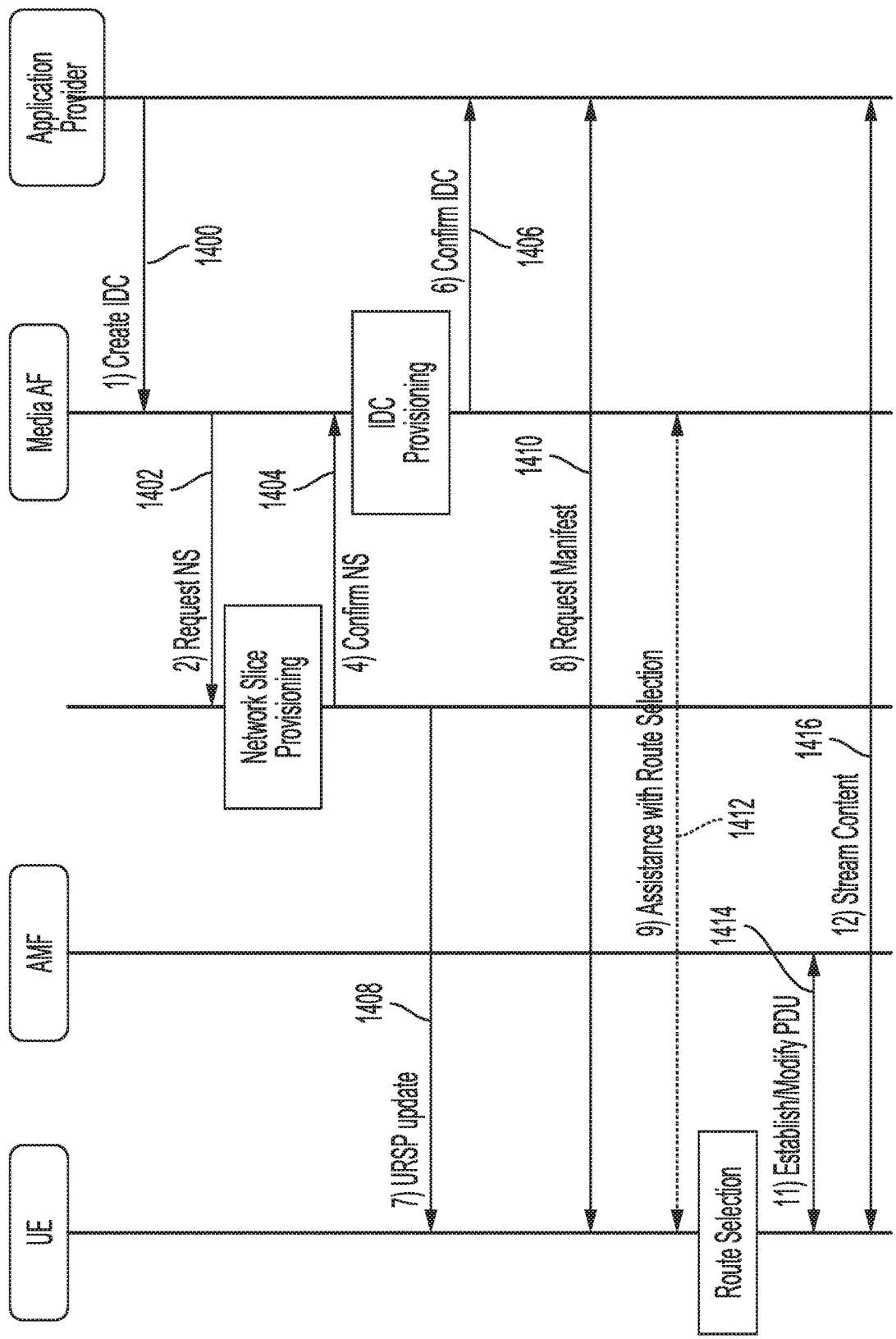
FIG. 14 illustrates an example flowchart diagram for a procedure according to some embodiments of the present disclosure.

FIG. 14 illustrates an example flowchart diagram for a procedure according to some embodiments of the present disclosure. The procedure may include the following.

1. At 1400, the external 5GMSA Application provider requests the creation of a new Ingest and Distribution Configuration for distributing its content. The 5GMSA Application provider indicates the anticipated operation points for the service. An operation point consists of the bandwidth and latency requirements, as well as any other parameters that may influence the policy for the sessions of this application (e.g. the charging profile, coverage area, route selection information, . . . ).

2. At 1402, the Media AF uses the interfaces defined in 3GPP TS 28.531, Management and orchestration; Provisioning to request the creation of a new network slice instance and provision it for the new distribution configuration.

3. If successful, the new S-NSSAI is added to the Configured NSSAI (this requires a UCU procedure) and stored in the UE profile in the UDM for the allowed UEs. The NSSF is configured with the S-NSSAI and related information (this includes information for the AMF to select the SMF). The SMF is configured with the S-NSSAI-related information (e.g. for UPF selection).

4. At 1404, the network confirms the creations of the new network slice(s) to the Media AF and provides the list of S-NSSAI(s) with their corresponding parameters.

5. The Ingest and Distribution Configuration is updated with the information about the network slices.

6. At 1406, the Media AF confirms successful setup of the Ingest and Distribution Configuration to the Application provider 7. At 1408, the PCF updates the URSP rules on the target set of UE(s), e.g. based on geographical service area of the offered application 8. At 1410, the 5GMSA Player starts or initiates a streaming session by fetching the entry point to the service 9. The Media Session Handler in the UE may retrieve information from the Media AF to assist with the route selection for the target operation point of the session. The Media Session Handler may get information about the target operation point from the media player.

10. At 1412, the UE performs the route selection procedure. The UE, when receiving a first packet for a new IP flow, checks the URSP rules for matching filters such as the traffic descriptors, the domain descriptors, or the Application descriptors. The UE will use the matching filter to retrieve the matching Route Selection descriptor, which provides the DNN, and the S-NSSAI(s).

11. At 1414, the UE requests the establishment of a PDU session with these parameters, if one doesn't exist already. Upon successful PDU session establishment, the AMF notifies the UE of the assigned QoS profile for the PDU session. This initiates a media session of the streaming service with an application server using the session information.

12. At 1416, the streaming of the media content at the target operation point starts. The UE may provide a playback of the media content.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

The invention claimed is:

1. A method for provisioning a service from a network, comprising:
   requesting session information with desired slice features corresponding to a streaming service;
   receiving the session information, wherein the session information includes quality-of-service (QoS) parameters and Network Slice Selection Assistance Information (S-NSSAI) for each of at least two network slices for distribution of the streaming service;
   initiating a media session of the streaming service with an application server, including selecting a network slice of the at least two network slices using the session information; and
   providing a media playback of the streaming service received in the media session.

2. The method of claim 1, further comprising:
   selecting a media session route using at least one of: a playback operation point, a traffic descriptor, a domain descriptor, or an application descriptor.

3. The method of claim 2, wherein the media session route is further selected with information from a media application function.

4. The method of claim 3, wherein the at least two network slices are selected by the media application function and provisioned for the distribution of the streaming service.

5. The method of claim 1, further comprising:
   initializing the streaming service by fetching an entry point to media content.

6. The method of claim 1, wherein the media playback is triggered by invoking a media player with an entry point to media content of the media session.

7. The method of claim 1, wherein the session information further includes at least one of: network slice information or a Data Network Name.

8. The method of claim 1, wherein the network supports 5G Media Streaming (5GMS).

9. An apparatus for provisioning a service from a network, comprising: a memory and a processor, the processor configured to:
   request a session information with desired slice features corresponding to a streaming service,
   receive the session information, wherein the session information includes quality-of-service (QoS) parameters and Network Slice Selection Assistance Information (S-NSSAI) for each of at least two network slices for distribution of the streaming service, initiate a media session of the streaming service with an application server, including selecting a network slice of the at least two network slices using the session information, and provide a media playback of the streaming service received in the media session.

10. The apparatus of claim 9, the processor further configured to:

select a media session route using at least one of: a playback operation point, a traffic descriptor, a domain descriptor, or an application descriptor.

11. The apparatus of claim 10, wherein the media session route is further selected with information from a media application function.

12. The apparatus of claim 11, wherein the at least two network slices are selected by the media application function and provisioned for the distribution of the streaming service.

13. The apparatus of claim 12, the processor further configured to:

initialize the streaming service by fetching an entry point to a media content.

14. The apparatus of claim 9, wherein the media playback is triggered by invoking a media player with an entry point to media content of the media session.

15. The apparatus of claim 9, wherein the session information further includes at least one of: network slice information or a Data Network Name.

16. The apparatus of claim 9, wherein the network supports 5G Media Streaming (5GMS).

17. An apparatus for provisioning a service from a network, comprising:

means for requesting a session information with desired slice features corresponding to a streaming service, means for receiving the session information, wherein the session information includes quality-of-service (QoS) parameters and Network Slice Selection Assistance Information (S-NSSAI) for each of at least two network slices for distribution of the streaming service, means for initiating a media session of the streaming service with an application server, including selecting a network slice of the at least two network slices using the session information, and means for providing a media playback of the streaming service received in the media session.

18. The apparatus of claim 17, further comprising:

means for selecting a media session route using at least one of: a playback operation point, a traffic descriptor, a domain descriptor, or an application descriptor.

19. The apparatus of claim 18, wherein the media session route is further selected with information from a media application function.

20. The apparatus of claim 19, wherein the at least two network slices are selected by the media application function and provisioned for the distribution of the streaming service.

21. The apparatus of claim 20, further comprising:

means for initializing the streaming service by fetching an entry point to a media content.

22. The apparatus of claim 17, wherein the media playback is triggered by invoking a media player with an entry point to media content of the media session.

23. The apparatus of claim 17, wherein the session information further includes at least one of: network slice information or a Data Network Name.

24. The apparatus of claim 17, wherein the network supports 5G Media Streaming (5GMS).

25. A non-transitory computer-readable medium storing computer executable code for provisioning a service from a network, the code when executed by a processor causes the processor to:

request a session information with desired slice features corresponding to a streaming service, receive the session information, wherein the session information includes quality-of-service (QoS) parameters and Network Slice Selection Assistance Information (S-NSSAI) for each of at least two network slices for distribution of the streaming service, initiate a media session of the streaming service with an application server, including selecting a network slice of the at least two network slices using the session information, and provide a media playback of the streaming service received in the media session.

26. The medium of claim 25, the code when executed by the processor further causes the processor to:

select a media session route using at least one of: a playback operation point, a traffic descriptor, a domain descriptor, and an application descriptor.

27. The medium of claim 26, wherein the media session route is further selected with information from a media application function and the at least two network slices are selected by the media application function and provisioned for the distribution of the streaming service.

28. The medium of claim 27, wherein the code when executed by the processor further causes the processor to:

initialize the streaming service by fetching an entry point to a media content.

29. The medium of claim 25, wherein the media playback is triggered by invoking a media player with an entry point to media content of the media session.

30. The medium of claim 25, wherein the session information further includes at least one of: network slice information or a Data Network Name and the network supports 5G Media Streaming (5GMS).

* * * * *